US010978981B2

United States Patent
Shimada et al.

(10) Patent No.: US 10,978,981 B2
(45) Date of Patent: Apr. 13, 2021

(54) DRIVE APPARATUS FOR ELECTRIC MOTOR AND AIR CONDITIONER

(71) Applicant: Mitsubishi Electric Corporation, Tokyo (JP)

(72) Inventors: Yuhei Shimada, Tokyo (JP); Kazunori Hatakeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/614,234

(22) PCT Filed: Aug. 8, 2017

(86) PCT No.: PCT/JP2017/028828
§ 371 (c)(1),
(2) Date: Nov. 15, 2019

(87) PCT Pub. No.: WO2019/030836
PCT Pub. Date: Feb. 14, 2019

(65) Prior Publication Data
US 2020/0186072 A1  Jun. 11, 2020

(51) Int. Cl.
*H02P 27/06* (2006.01)
*F25B 1/00* (2006.01)
(Continued)

(52) U.S. Cl.
CPC ............. *H02P 25/184* (2013.01); *F25B 1/00* (2013.01); *H02M 7/53871* (2013.01); *H02P 27/06* (2013.01); *H02M 5/4585* (2013.01)

(58) Field of Classification Search
CPC .......... H02P 27/06; H02P 25/184; H02P 1/32; H02P 6/10; H02M 7/53871; H02M 5/4585; H02M 7/5387; F25B 1/00; F25B 2400/22
See application file for complete search history.

(56) References Cited

U.S. PATENT DOCUMENTS 4,644,242 A * 2/1987 Takata ................ H02P 25/20
                                                    318/771
6,255,797 B1 * 7/2001 Nakamura ............ H02P 25/20
                                                    318/771
(Continued)

FOREIGN PATENT DOCUMENTS

JP    H03-265486 A    11/1991
JP    H09-191689 A     7/1997
(Continued)

OTHER PUBLICATIONS

European Search Report dated Sep. 9, 2020 issued in the corresponding European application No. 17921011.7.
(Continued)

*Primary Examiner* — Thai T Dinh
(74) *Attorney, Agent, or Firm* — Posz Law Group, PLC

(57) ABSTRACT

A drive apparatus for an electric motor includes an inverter, an inverter substrate, a wire connection switching unit, a control unit, and an alternating-current wire electrically connected at one end to the inverter and at the other end to one end of the windings of an electric motor. The drive apparatus for an electric motor includes an alternating-current wire electrically connected at one end to the alternating-current wires and electrically connected at the other end to one end of the wire connection switching unit, and an alternating-current wire electrically connected at one end to the other end of the wire connection switching unit and electrically connected at the other end to the other end of the windings of the electric motor. The drive apparatus for an electric motor includes a noise suppression unit provided at least on the alternating-current wires to suppress noise that occurs in the alternating-current wire.

8 Claims, 11 Drawing Sheets

(51) Int. Cl.
*H02P 25/18* (2006.01)
*H02M 7/5387* (2007.01)
*H02M 5/458* (2006.01)

(56) References Cited

U.S. PATENT DOCUMENTS

| | | | |
|---|---|---|---|
| 6,362,592 B1* | 3/2002 | Chrappan Soldavini | .................... H02P 6/085 318/768 |
| 9,746,216 B2* | 8/2017 | Yamakawa | ............. F25B 13/00 |
| 10,320,220 B2* | 6/2019 | Ge | ........................... H02P 25/18 |
| 2002/0079706 A1* | 6/2002 | Rebsdorf | ................. H02M 1/42 290/55 |
| 2013/0180273 A1* | 7/2013 | Hatakeyama | ......... F25B 49/025 62/115 |
| 2015/0168033 A1* | 6/2015 | Yamakawa | ............. F25B 13/00 62/324.6 |

FOREIGN PATENT DOCUMENTS

| | | | |
|---|---|---|---|
| JP | 2006-246674 A | 9/2006 |
| JP | 2008-067534 A | 3/2008 |
| JP | 2008-228513 A | 9/2008 |
| JP | 2011-199984 A | 10/2011 |

OTHER PUBLICATIONS

International Search Report of the International Searching Authority dated Oct. 24, 2017 for the corresponding international application No. PCT/JP2017/028828 (and English translation).
European Search Report issued in the corresponding European application No. 17921011.7.

\* cited by examiner

DRIVE APPARATUS FOR ELECTRIC MOTOR AND AIR CONDITIONER

CROSS REFERENCE TO RELATED APPLICATION

This application is a U.S. national stage application of International Patent Application No. PCT/JP2017/028828 filed on Aug. 8, 2017, the disclosure of which is incorporated herein by reference.

TECHNICAL FIELD

The present invention relates to a drive apparatus for an electric motor and an air conditioner including a drive apparatus for an electric motor.

BACKGROUND

The electric motor drive apparatus disclosed in Patent Literature 1 includes a wire connection switching device. The wire connection switching device switches the wire connection state of the windings of the electric motor to star connection or delta connection in accordance with the rotational speed of the electric motor. By switching the wire connection state of the windings of the electric motor, the electric motor drive apparatus disclosed in Patent Literature 1 enables high efficiency operation during the low speed operation of the electric motor and enables high output operation during the high speed operation.

Patent Literature 2 discloses an alternating-current electric motor that switches its wire connection state in the same manner as in Patent Literature 1. Specifically, Patent Literature 2 discloses a technique of reducing the harmonic current included in the power supply voltage in the wire connection state for high speed output characteristics by inserting a reactor in the wire connection state for high speed output characteristics and removing the reactor in the wire connection state for low speed output characteristics. By inserting the reactor in the wire connection state for high speed output characteristics and removing the reactor in the wire connection state for low speed output characteristics, the harmonic current included in the power supply voltage is reduced only in the wire connection state for high speed output characteristics. The technique described in Patent Literature 2 can reduce heat generation during the high speed operation of the alternating-current electric motor while preventing a reduction in output during the low speed operation of the alternating-current electric motor.

Patent Literature

Patent Literature 1: Japanese Patent Application Laid-open No. 2006-246674
Patent Literature 2: Japanese Patent Application Laid-open No. H9-191689

The electric motor drive apparatus disclosed in Patent Literature 1 includes a larger number of wires between the inverter and the electric motor than an electric motor drive apparatus including no wire connection switching device. It is therefore assumed that the number of electromagnetic compatibility (EMC) control components increases as the number of wires increases. Thus, the EMC control structure is liable to become complicated.

In the alternating-current electric motor disclosed in Patent Literature 2, no measure is taken to suppress the noise resulting from the circulating current flowing between the three-phase windings of the electric motor in the Δ connection state. The technique disclosed in Patent Literature 2 removes the reactor in the wire connection state for low speed output characteristics. Therefore, it is difficult for this technique to conform to the EMC standard, which may create the need for measures against electromagnetic interference (EMI) noise. In that case, an additional component for EMI noise control is required, which is problematic because the noise control structure becomes complicated.

SUMMARY

The present invention has been made in view of the above, and an object thereof is to obtain a drive apparatus for an electric motor with a simplified noise control structure.

In order to solve the problems described above and to achieve the object, a drive apparatus for an electric motor according to an aspect of the present invention includes: an inverter to supply alternating-current power to an electric motor including windings; a first substrate on which the inverter is provided; a wire connection switching unit to switch a wire connection state of the windings from Y connection to Δ connection or from Δ connection to Y connection; and a control unit to control the inverter and the wire connection switching unit. The drive apparatus for an electric motor includes a first alternating-current wire electrically connected at one end to the inverter and electrically connected at another end to ends on one side of the windings; and a second alternating-current wire electrically connected at one end to the first alternating-current wire and electrically connected at another end to one end of the wire connection switching unit. The drive apparatus for an electric motor includes a third alternating-current wire electrically connected at one end to another end of the wire connection switching unit and electrically connected at another end to ends on another side of the windings; and a noise suppression unit provided at least on the first alternating-current wire to suppress noise that occurs in the first alternating-current wire.

The drive apparatus for an electric motor according to the present invention can achieve the effect of simplifying the noise control structure.

DETAILED DESCRIPTION

Hereinafter, a drive apparatus for an electric motor and an air conditioner according to embodiments of the present invention will be described in detail based on the drawings. The present invention is not limited to the embodiments.

First Embodiment

Figure 1:
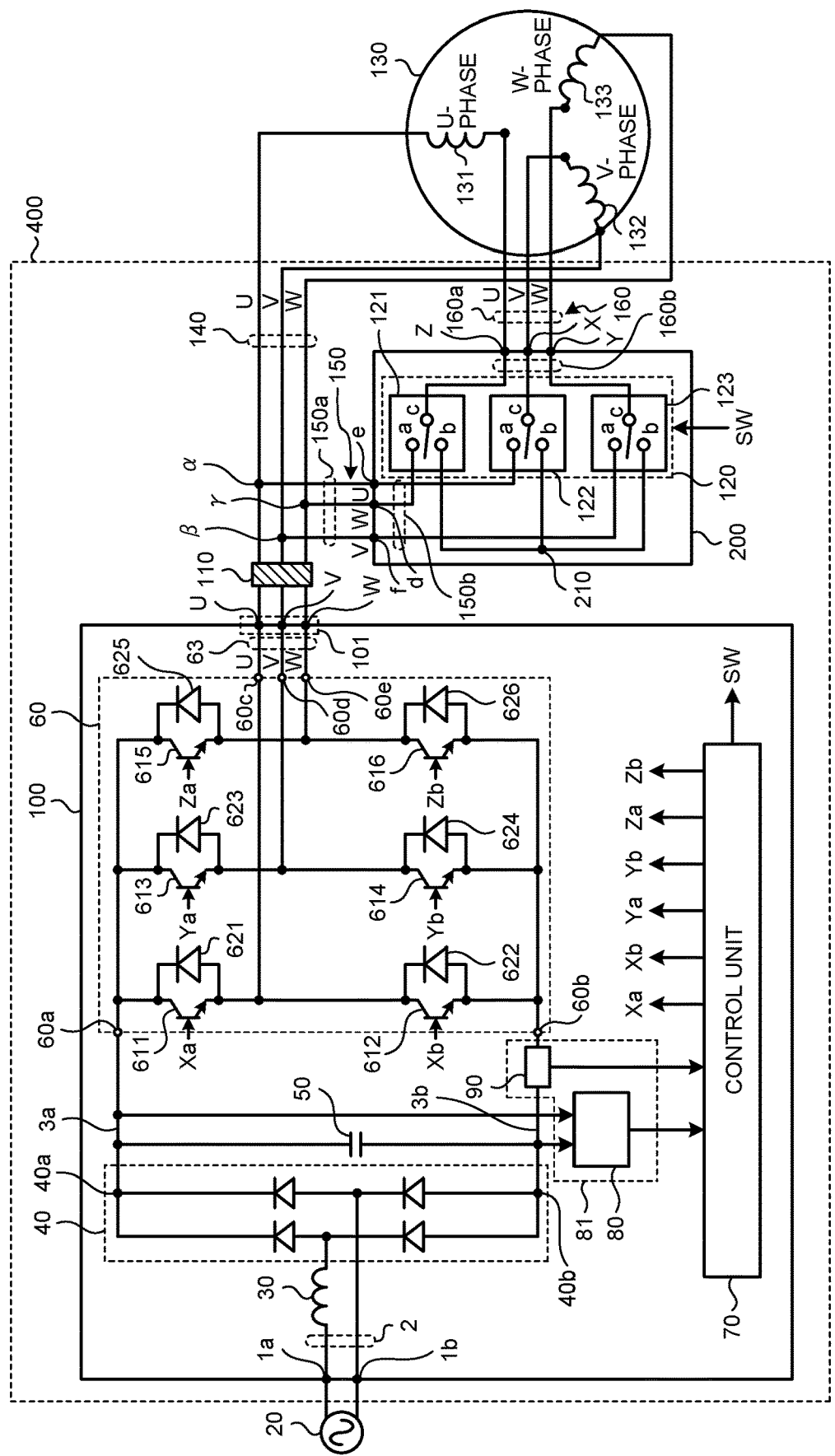
FIG. 1 is a diagram illustrating an exemplary configuration of a drive apparatus for an electric motor according to a first embodiment.

FIG. 1 is a diagram illustrating an exemplary configuration of a drive apparatus for an electric motor according to a first embodiment. A drive apparatus 400 for an electric motor is a power converting apparatus that converts alternating-current power supplied from an alternating-current power supply 20 into alternating-current power of a frequency at which an electric motor 130 can be driven. The drive apparatus 400 for an electric motor includes an inverter substrate 100, a noise suppression unit 110, a relay substrate 200, alternating-current wires 140 which are a first alternating-current wire, alternating-current wires 150 which are a second alternating-current wire, and alternating-current wires 160 which are a third alternating-current wire.

The inverter substrate 100 which is a first substrate includes alternating-current wires 2, a reactor 30, a rectifier 40, a smoothing capacitor 50, an inverter 60, a control unit 70, and a detection unit 81. The alternating-current wires 2, the reactor 30, the rectifier 40, the smoothing capacitor 50, the inverter 60, the control unit 70, and the detection unit 81 are provided on the mounting surface of the inverter substrate 100. The mounting surface is a surface on which components are mounted among a plurality of end surfaces provided on the inverter substrate 100.

The alternating-current power supply 20 and ends on one side of the alternating-current wires 2 are connected to an alternating-current input terminal 1a and an alternating-current input terminal 1b of the inverter substrate 100. The alternating-current wires 2 are pattern wires formed on the mounting surface of the inverter substrate 100 in order to transmit alternating-current power from the alternating-current power supply 20 to the rectifier 40. Ends on the other side of the alternating-current wires 2 are connected to the rectifier 40.

The reactor 30 for power factor improvement is provided on the alternating-current wires 2. One end of the reactor 30 is electrically connected to the alternating-current input terminal 1a. The other end of the reactor 30 is electrically connected to the rectifier 40.

The rectifier 40 rectifies the alternating-current power supplied from the alternating-current power supply 20. The rectifier 40 is a full wave rectifier circuit including a combination of four diodes. The rectifier 40 may include a combination of two or more metal oxide semiconductor-field effect transistors (MOSFETs) instead of diodes.

The smoothing capacitor 50 smooths the power rectified by the rectifier 40. One end of the smoothing capacitor 50 is connected to a direct-current bus 3a. The direct-current bus 3a is a high potential side wire provided between the rectifier 40 and the inverter 60. One end of the direct-current bus 3a is connected to a positive output terminal 40a of the rectifier 40. The other end of the direct-current bus 3a is connected to a positive input terminal 60a of the inverter 60. The other end of the smoothing capacitor 50 is connected to a direct-current bus 3b. The direct-current bus 3b is a low potential side wire provided between the rectifier 40 and the inverter 60. One end of the direct-current bus 3b is connected to a negative output terminal 40b of the rectifier 40. The other end of the direct-current bus 3b is connected to a negative input terminal 60b of the inverter 60.

The inverter 60 is a power converter that converts the power smoothed by the smoothing capacitor 50 into alternating-current power and supplies the alternating-current power obtained by the conversion to the electric motor 130. The inverter 60 includes a plurality of switching elements 611 to 616 and a plurality of freewheeling diodes 621 to 626. Hereinafter, when the switching elements 611 to 616 are not distinguished from one another, they are simply referred to as switching elements. Similarly, when the plurality of freewheeling diodes 621 to 626 are not distinguished from one another, they are simply referred to as diodes.

The switching element 611 is an element that performs switching operation in accordance with a drive signal Xa output from the control unit 70. The switching element 611 may be any element that performs switching operation in accordance with the drive signal Xa output from the control unit 70, and is not limited to a bipolar transistor. The same applies to each of the switching elements 612 to 616. Switching operation is the operation of switching between the on state of the switching element 611 and the off state of the switching element 611. The on state is a state in which current flows between the collector and the emitter of the switching element 611, and the off state is a state in which current does not flow between the collector and the emitter of the switching element 611. The collector of the switching element 611 is connected to the positive input terminal 60a. The emitter of the switching element 611 is connected to the collector of the switching element 612. The connection point of the switching element 611 and the switching element 612 is connected to an output terminal 60c of the inverter 60.

One end of a U-phase alternating-current wire 63 is connected to the output terminal 60c. Alternating-current wires 63 are pattern wires formed on the mounting surface of the inverter substrate 100 in order to transmit alternating-current power from the inverter 60 to the electric motor 130. The other end of the U-phase alternating-current wire 63 is connected to a U-phase alternating-current output terminal 101.

Alternating-current output terminals 101 are terminals provided on the mounting surface of the inverter substrate 100. One end of the U-phase alternating-current wire 140 is connected to the U-phase alternating-current output terminal 101. The alternating-current wires 140 are wires provided between the alternating-current output terminals 101 and the electric motor 130 in order to transmit alternating-current power from the inverter 60 to the electric motor 130. The other end of the U-phase alternating-current wire 140 is connected to one end of a U-phase winding 131 of the electric motor 130.

The switching element 612 is a switching element that performs switching operation in accordance with a drive signal Xb output from the control unit 70. The emitter of the switching element 612 is connected to the negative input terminal 60b.

The switching element 613 is a switching element that performs switching operation in accordance with a drive signal Ya output from the control unit 70. The collector of the switching element 613 is connected to the positive input terminal 60a. The emitter of the switching element 613 is connected to the collector of the switching element 614. The connection point of the switching element 613 and the switching element 614 is connected to an output terminal 60d of the inverter 60. One end of the V-phase alternating-current wire 63 is connected to the output terminal 60d. The other end of the V-phase alternating-current wire 63 is connected to the V-phase alternating-current output terminal 101. One end of the V-phase alternating-current wire 140 is connected to the V-phase alternating-current output terminal 101. The other end of the V-phase alternating-current wire 140 is connected to one end of a V-phase winding 132 of the electric motor 130.

The switching element 614 is a switching element that performs switching operation in accordance with a drive signal Yb output from the control unit 70. The emitter of the switching element 614 is connected to the negative input terminal 60b.

The switching element 615 is a switching element that performs switching operation in accordance with a drive signal Za output from the control unit 70. The collector of the switching element 615 is connected to the positive input terminal 60a. The emitter of the switching element 615 is connected to the collector of the switching element 616. The connection point of the switching element 615 and the switching element 616 is connected to an output terminal 60e of the inverter 60. One end of the W-phase alternating-current wire 63 is connected to the output terminal 60e. The other end of the W-phase alternating-current wire 63 is connected to the W-phase alternating-current output terminal 101. One end of the W-phase alternating-current wire 140 is connected to the W-phase alternating-current output terminal 101. The other end of the W-phase alternating-current wire 140 is connected to one end of a W-phase winding 133 of the electric motor 130.

The switching element 616 is a switching element that performs switching operation in accordance with a drive signal Zb output from the control unit 70. The emitter of the switching element 616 is connected to the negative input terminal 60b.

Hereinafter, when the plurality of drive signals Xa to Zb are not distinguished from one another, they are simply referred to as drive signals.

The freewheeling diode 621 is connected in antiparallel to the switching element 611. That is, the cathode which is the negative electrode of the freewheeling diode 621 is connected to the collector of the switching element 611, and the anode which is the positive electrode of the freewheeling diode 621 is connected to the emitter of the switching element 611. Note that the freewheeling diode 621 may be any element having a rectifying function, and is not limited to a diode. The same applies to each of the freewheeling diodes 622 to 626.

Similarly, the freewheeling diode 622 is connected in antiparallel to the switching element 612. The freewheeling diode 623 is connected in antiparallel to the switching element 613. The freewheeling diode 624 is connected in antiparallel to the switching element 614. The freewheeling diode 625 is connected in antiparallel to the switching element 615. The freewheeling diode 626 is connected in antiparallel to the switching element 616.

The control unit 70 generates drive signals and a switching signal SW based on at least one of the detection value detected by a voltage detection unit 80 of the detection unit 81 and the detection value detected by a current detection unit 90 of the detection unit 81. The voltage detection unit 80 detects the voltage applied to the direct-current bus 3a and the direct-current bus 3b, and outputs the detected voltage detection value to the control unit 70. The current detection unit 90 detects the current flowing through the direct-current bus 3b, and outputs the detected current detection value to the control unit 70. The switching signal SW is a signal that controls the operation of a wire connection switching unit 120. By inputting the switching signal SW to the wire connection switching unit 120, the wire connection state of the windings of the electric motor 130 is switched to Y connection or Δ connection.

The positions where the voltage detection unit 80 and the current detection unit 90 are provided are not limited to the positions illustrated in FIG. 1 as long as information necessary for the operation of the control unit 70 can be detected. Specifically, the voltage detection unit 80 may be provided at a position where the voltage divided by a resistor provided in parallel with the smoothing capacitor 50 can be detected. The voltage detection unit 80 provided in this manner converts the voltage across the smoothing capacitor 50, that is, the input side voltage of the inverter 60, into a voltage detectable by the control unit 70 and outputs this voltage. The current detection unit 90 may be provided at a position where the current flowing through the alternating-current wires 63 can be detected. In the current detection unit 90 provided in this manner, the current flowing from the inverter 60 to the electric motor 130 is detected.

The wire connection switching unit 120 is provided on the mounting surface of the relay substrate 200 which is a second substrate. The wire connection switching unit 120 is a set of switches for switching the wire connection state of the windings of the electric motor 130 from Y connection to Δ connection or from Δ connection to Y connection. The wire connection switching unit 120 includes a switch 121, a switch 122, and a switch 123. Each of the switch 121, the switch 122, and the switch 123 is a change-over-contact relay.

The switch 121 includes a contact a, a contact b, and a contact c. The contact c is connected to the contact a when energized and is connected to the contact b when deenergized.

The contact a of the switch 121 is connected to an input terminal d via a W-phase wire 150b of the alternating-current wires 150. The alternating-current wires 150 are wires for connecting the wire connection switching unit 120 to the alternating-current wires 140. The alternating-current wires 150 include wires 150a and wires 150b. The wires 150a are wires provided between the alternating-current wires 140 and the relay substrate 200. The wires 150b are pattern wires formed on the mounting surface of the relay substrate 200. One end of the W-phase wire 150b is connected to the input terminal d. The other end of the W-phase wire 150b is connected to the contact a of the switch 121. The input terminal d is a terminal provided on the mounting surface of the relay substrate 200. One end of the W-phase wire 150a is connected to the input terminal d. The other end of the W-phase wire 150a is connected to the W-phase alternating-current wire 140. The connection point of the other end of the W-phase wire 150a and the W-phase alternating-current wire 140 is indicated by reference sign γ. The position of the connection point γ is between the noise suppression unit 110 and the electric motor 130 on the W-phase alternating-current wire 140.

The contact b of the switch 121 is electrically connected to a terminal 210. The terminal 210 is a terminal provided on the mounting surface of the relay substrate 200. The terminal 210 serves as a neutral point for Δ connection.

The contact c of the switch 121 is connected to an input terminal Z via a U-phase wire 160b of the alternating-current wires 160. The alternating-current wires 160 are wires for connecting the wire connection switching unit 120 to the electric motor 130. The alternating-current wires 160 include wires 160a and wires 160b. The wires 160a are wires provided between the electric motor 130 and the relay substrate 200. The wires 160b are pattern wires formed on the mounting surface of the relay substrate 200. One end of the U-phase wire 160b is connected to the contact c of the switch 121. The other end of the U-phase wire 160b is connected to the input terminal Z. The input terminal Z is a terminal provided on the mounting surface of the relay substrate 200. One end of the U-phase wire 160a is connected to the input terminal Z. The other end of the U-phase wire 160a is connected to the other end of the U-phase winding 131 of the electric motor 130.

When the switch 121 is in the connection state A, the other end of the U-phase winding 131 is electrically connected to the connection point γ. The connection state A is a state in which the contact c is connected to the contact a. When the switch 121 is in the connection state B, the other end of the U-phase winding 131 is electrically connected to the contacts b of the switch 122 and the switch 123. The connection state B is a state in which the contact c is connected to the contact b.

The contact a of the switch 122 is connected to an input terminal e via the U-phase wire 150b. One end of the U-phase wire 150b is connected to the input terminal e. The other end of the U-phase wire 150b is connected to the contact a of the switch 122. The input terminal e is a terminal provided on the mounting surface of the relay substrate 200. One end of the U-phase wire 150a is connected to the input terminal e. The other end of the U-phase wire 150a is connected to the U-phase alternating-current wire 140. The connection point of the other end of the U-phase wire 150a and the U-phase alternating-current wire 140 is indicated by reference sign α. The position of the connection point α is between the noise suppression unit 110 and the electric motor 130 on the U-phase alternating-current wire 140.

The contact b of the switch 122 is electrically connected to the terminal 210.

The contact c of the switch 122 is connected to an input terminal X via the V-phase wire 160b of the alternating-current wires 160. One end of the V-phase wire 160b is connected to the contact c of the switch 122. The other end of the V-phase wire 160b is connected to the input terminal X. The input terminal X is a terminal provided on the mounting surface of the relay substrate 200. One end of the V-phase wire 160a is connected to the input terminal X. The other end of the V-phase wire 160a is connected to the other end of the V-phase winding 132 of the electric motor 130.

When the switch 122 is in the connection state A, the other end of the V-phase winding 132 is electrically connected to the connection point α. When the switch 122 is in the connection state B, the other end of the V-phase winding 132 is electrically connected to the contacts b of the switch 121 and the switch 123.

The contact a of the switch 123 is connected to an input terminal f via the V-phase wire 150b. One end of the V-phase wire 150b is connected to the input terminal f. The other end of the V-phase wire 150b is connected to the contact a of the switch 123. The input terminal f is a terminal provided on the mounting surface of the relay substrate 200. One end of the V-phase wire 150a is connected to the input terminal f. The other end of the V-phase wire 150a is connected to the V-phase alternating-current wire 140. The connection point of the other end of the V-phase wire 150a and the V-phase alternating-current wire 140 is indicated by reference sign β. The position of the connection point β is between the noise suppression unit 110 and the electric motor 130 on the V-phase alternating-current wire 140.

The contact b of the switch 123 is electrically connected to the terminal 210.

The contact c of the switch 123 is connected to an input terminal Y via the W-phase wire 160b of the alternating-current wires 160. One end of the W-phase wire 160b is connected to the contact c of the switch 123. The other end of the W-phase wire 160b is connected to the input terminal Y. The input terminal Y is a terminal provided on the mounting surface of the relay substrate 200. One end of the W-phase wire 160a is connected to the input terminal Y. The other end of the W-phase wire 160a is connected to the other end of the W-phase winding 133 of the electric motor 130.

When the switch 123 is in the connection state A, the other end of the W-phase winding 133 is electrically connected to the connection point β. When the switch 123 is in the connection state B, the other end of the W-phase winding 133 is electrically connected to the contacts b of the switch 121 and the switch 122.

The noise suppression unit 110 is provided on the three alternating-current wires 140 of the U phase, the V phase, and the W phase. Specifically, the noise suppression unit 110 is provided between the alternating-current output terminals 101 and the connection points α, β, and γ on the alternating-current wires 140 extending from the alternating-current output terminals 101 to the electric motor 130. The noise suppression unit 110 can be exemplified by a cylindrical magnetic body, an inductor, or a bypass capacitor. A ferrite core is used for a magnetic body. A ferrite core may be provided on the alternating-current wires 140 or may be provided on a power signal line or ground wire provided adjacent to the alternating-current wires 140. The power signal line is a signal transmission wire extending from the alternating-current output terminals 101 to the electric motor 130. The signal transmission wire is used to transmit information on the detected motor rotational position. The ground wire is a grounding wire extending from the alternating-current output terminals 101 to the electric motor 130. A ferrite bead, a choke coil, or a reactor is used for an inductor. An across-the-line capacitor or a line bypass capacitor is used for a bypass capacitor. The noise suppression unit 110 may include one of a magnetic body, an inductor, and a bypass capacitor, or may include a combination of two or more of a magnetic body, an inductor, and a bypass capacitor.

The electric motor 130 includes the U-phase winding 131, the V-phase winding 132, and the W-phase winding 133. The U-phase winding 131, the V-phase winding 132, and the W-phase winding 133 can be switched to Y connection or Δ connection depending on the connection state of the switches 121 to 123. Switching the wire connection state of the windings of the electric motor 130 to Y connection or Δ connection enables high output drive and high efficiency drive of the electric motor 130. Hereinafter, when the U-phase winding 131, the V-phase winding 132, and the W-phase winding 133 are not distinguished from one another, they are simply referred to as windings.

Next, with reference to FIGS. 2 and 3, the reason why the wire connection state of the windings of the electric motor 130 is switched to Y connection or Δ connection will be described.

Figure 2:
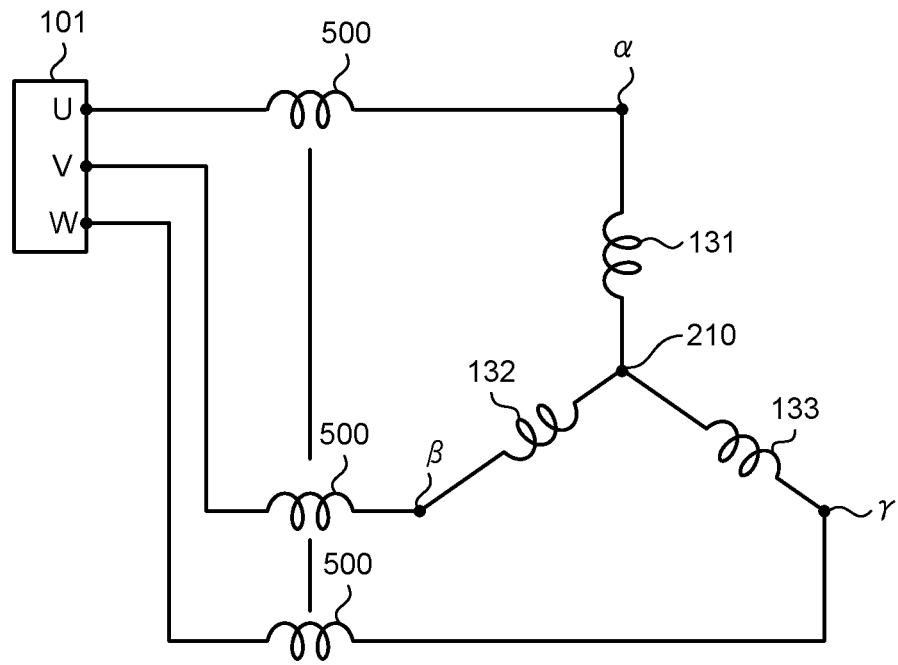
FIG. 2 is a diagram illustrating windings whose wire connection state is set to Y connection by the drive apparatus for an electric motor according to the first embodiment.

FIG. 2 is a diagram illustrating windings whose wire connection state is set to Y connection by the drive apparatus for an electric motor according to the first embodiment. When each of the switches 121 to 123 is in the connection state B, the wire connection state of the windings of the electric motor 130 is Y connection as illustrated in FIG. 2. Inductances 500 illustrated in FIG. 2 are inductance components that are formed in the alternating-current wires 140 in the Y connection state in a case where the noise suppression unit 110 of FIG. 1 is a magnetic body.

Figure 3:
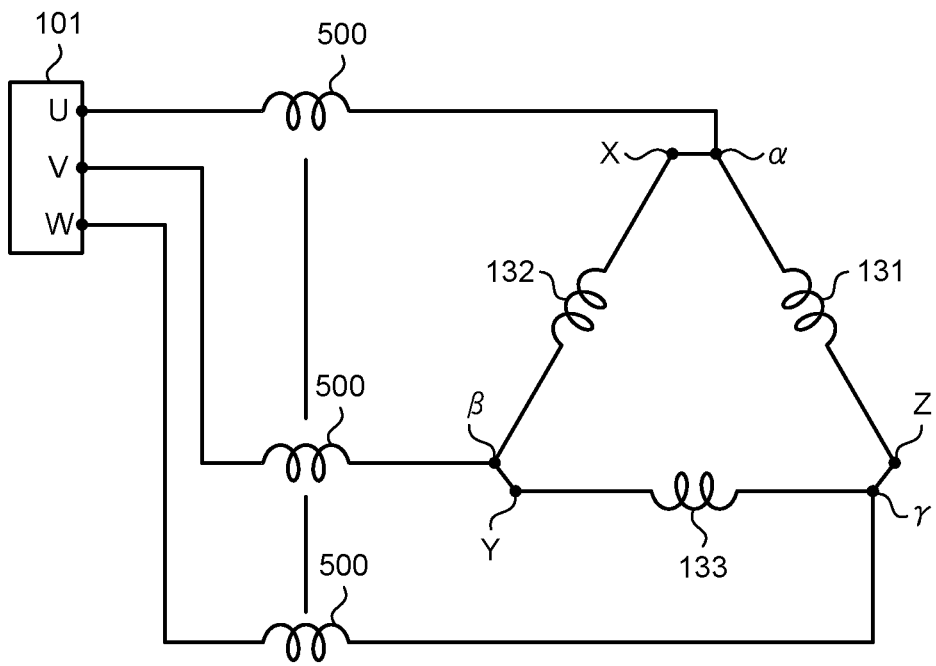
FIG. 3 is a first diagram illustrating windings whose wire connection state is set to Δ connection by the drive apparatus for an electric motor according to the first embodiment.

FIG. 3 is a first diagram illustrating windings whose wire connection state is set to Δ connection by the drive apparatus for an electric motor according to the first embodiment. When each of the switches 121 to 123 is in the connection state A, the wire connection state of the windings of the electric motor 130 is Δ connection as illustrated in FIG. 3. The inductances 500 illustrated in FIG. 3 are inductance components that are formed in the alternating-current wires 140 in the Δ connection state in a case where the noise suppression unit 110 of FIG. 1 is a magnetic body.

Let VY represent the line voltage of the electric motor 130 in the Y connection state and IY represent the current flowing in the Y connection state. Further, let VΔ represent the line voltage of the electric motor 130 in the Δ connection state and IΔ represent the current flowing in the Δ connection state. Under these definitions, the line voltage VY can be expressed by VY=√3×VΔ. The current IΔ can be expressed by √3×IY=IΔ. That is, the current in the Δ connection state is larger than the current in the Y connection state at the same rotational speed as the Δ-connected electric motor 130, but the voltage necessary for driving the electric motor 130 in the Δ connection state can be lower than the voltage in the Y connection state at the same rotational speed as the Δ-connected electric motor 130.

With the recent growing needs for energy saving, brushless DC motors are widely used as the electric motor 130. A permanent magnet is used for the rotor of a brushless DC motor. In a case where a brushless DC motor is used as the electric motor 130, as the rotational speed of the rotor increases, the back electromotive voltage of the electric motor 130 increases, and the voltage value necessary for driving the electric motor 130 increases. The back electromotive voltage is an electromotive voltage that causes, due to the power generation operation of the electric motor 130, a current to flow in the direction opposite to the direction of the current flowing when the electric motor 130 is driven.

Now consider the case where the Y-connected electric motor 130 is driven by the inverter 60. In this case, the voltage necessary for driving the electric motor 130 at the same rotational speed as the Δ-connected electric motor 130 is larger than the voltage for driving the Δ-connected electric motor 130. As the voltage necessary for driving the electric motor 130 increases, the back electromotive voltage increases. In order to prevent the back electromotive voltage from increasing, a measure such as reducing the magnetic force of the permanent magnet or uncoiling the stator windings is required. However, this measure causes more current to flow through the electric motor 130 and the inverter 60 and results in an inevitable decrease in efficiency. Therefore, when the electric motor 130 is driven at a rotational speed higher than a specific rotational speed, the wire connection state is switched from Y connection to Δ connection. Consequently, the voltage necessary for driving the electric motor 130 becomes 1/√3 times the voltage in the Y connection state. Therefore, the operation of the electric motor 130 can be continued without the above measure.

For example, suppose the electric motor 130 is used for a recent air conditioner. At the start of operation, if the difference between a set temperature and room temperature is larger than a specific value, the air conditioner increases the rotational speed of the electric motor 130 until the room temperature approaches the set temperature. On the other hand, the air conditioner reduces the rotational speed of the electric motor 130 when a set temperature is substantially equal to room temperature. The term "substantially equal" means that the temperature difference between a set temperature and room temperature is, for example, within 0.5° C. Here, the ratio of the low speed operation time to the entire operation time is larger than the ratio of the high speed operation time to the entire operation time. The low speed operation time is the time during which the electric motor 130 operates at a low rotational speed lower than a specific rotational speed. The high speed operation time is the time during which the electric motor 130 operates at a high rotational speed higher than a specific rotational speed. Therefore, when driving the electric motor 130 at a low rotational speed, which requires a low drive voltage, the drive apparatus 400 for an electric motor uses Y connection so that the current can be reduced. When driving the electric motor 130 at a high rotational speed, the drive apparatus 400 for an electric motor uses Δ connection. The use of Y connection for driving the electric motor 130 at a low rotational speed can contribute to not only making the value of the current flowing through the electric motor 130 1/√3 times that in the Δ connection state, but also setting the diameter and the number of turns of the windings in the Y connection state to optimum values for low rotational speed. Therefore, the value of the current flowing through the electric motor 130 can be reduced significantly, as compared with the case where the electric motor 130 is configured to operate in the Y connection state over the entire range of rotational speeds. Thus, the loss that occurs due to the flow of current through the inverter 60 can be reduced, and the power conversion efficiency in the inverter 60 improves.

On the other hand, when driving the electric motor 130 at a high rotational speed, the drive apparatus 400 for an electric motor sets the wire connection state of the windings of the electric motor 130 to Δ connection. Consequently, the electric motor 130 can be driven at a voltage of 1/√3 times the voltage for the electric motor 130 in which the diameter and the number of turns of the windings in the Y connection state are set to optimum values for low rotational speed. Therefore, the electric motor 130 can be driven over the entire range of rotational speeds without uncoiling the windings, and the entire range of rotational speeds can be controlled without using flux-weakening control that increases the current value more than necessary.

It is to be noted that since the drive apparatus 400 for an electric motor according to the first embodiment includes the wire connection switching mechanism that switches the wire connection state of the windings to Y connection or Δ connection, the number of alternating-current wires between the drive apparatus 400 for an electric motor and the electric motor 130 is three times that of a drive apparatus for an electric motor that does not include a wire connection switching mechanism. That is, a drive apparatus for an electric motor that does not include a wire connection switching mechanism includes one set of alternating-current wires connecting the drive apparatus for an electric motor and the electric motor, whereas the drive apparatus 400 for an electric motor according to the first embodiment requires the alternating-current wires 140, the alternating-current wires 150, and the alternating-current wires 160. As the number of alternating-current wires increases, the number of attachment places for EMI countermeasure components increases. Therefore, the EMI countermeasure structure becomes larger and more complicated. In a case where the drive apparatus 400 for an electric motor with a large EMI countermeasure structure is installed in the outdoor unit of an air conditioner, there is a possibility that the installation space for the drive apparatus 400 for an electric motor in the housing of the outdoor unit cannot be secured. Therefore, it is necessary to take a measure such as enlarging the housing of the outdoor unit or rearranging the components inside the outdoor unit. The housing of the outdoor unit is an electrical component box provided inside the outdoor unit or a housing that constitutes the outer shell of the outdoor unit. As the number of attachment places for EMI countermeasure components increases, the EMI countermeasure cost can increase, and the loss due to EMI countermeasure components can also increase. Describing the loss due to EMI countermeasure components, for example, in a case where a ferrite core is used for an EMI countermeasure component, reactance appears as a resistive component in a high frequency range, and the current flowing through the alternating-current wires 140 is converted to heat. This heat corresponds to the loss due to the EMI countermeasure component.

Figure 4:
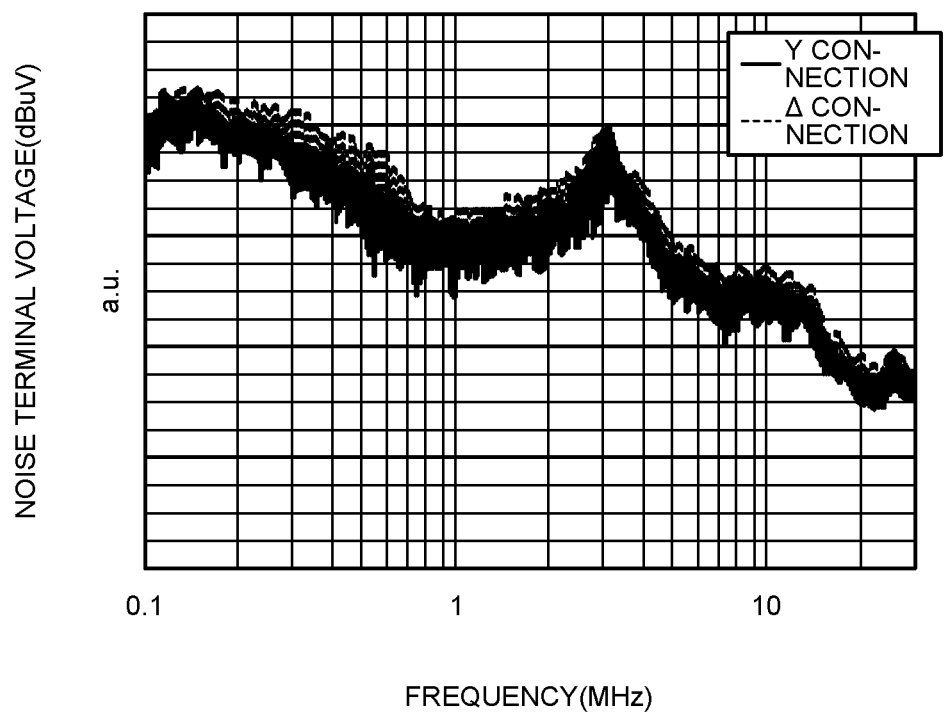
FIG. 4 is a diagram illustrating noise terminal voltage characteristics for the case that a noise suppression unit is not provided between the inverter and the electric motor illustrated in FIG. 1.

FIG. 4 is a diagram illustrating noise terminal voltage characteristics for the case that a noise suppression unit is not provided between the inverter and the electric motor illustrated in FIG. 1. The vertical axis of FIG. 4 represents the noise terminal voltage, and the horizontal axis of FIG. 4 represents the frequency. The solid line is noise terminal voltage characteristics for Y connection. The broken line is noise terminal voltage characteristics for Δ connection. The noise terminal voltage characteristics represent frequency characteristics or noise levels. The noise terminal voltage characteristics depend on the specifications of the electric motor 130 and the specifications of the drive apparatus 400 for an electric motor. That is, the noise terminal voltage characteristics depend on the switching elements constituting the inverter 60, the output voltage level of the inverter 60, the switching frequencies of the switching elements, the load requirement of the electric motor 130, the drive frequency of the electric motor 130, and the length of the wires between the inverter 60 and the electric motor 130. The exemplary configuration of the drive apparatus 400 for an electric motor according to the first embodiment is not limited to the illustrated example, and therefore the noise terminal voltage characteristics are not limited to the characteristics in FIG. 4. According to the noise terminal voltage characteristics for Δ connection, noise occurs due to the circulating current flowing between the three-phase windings of the electric motor 130 in addition to the switching noise that occurs when the inverter 60 is driven. The circulating current flowing between the three-phase windings of the electric motor 130 is a current circulating between the U-phase winding 131, the V-phase winding 132, and the W-phase winding 133.

Therefore, the noise terminal voltage characteristics for Δ connection are likely to have larger noise terminal voltages than the noise terminal voltage characteristics for Y connection in the noise characteristic frequency band from 200 [kHz] to 2 [MHz]. For designing the drive apparatus 400 for an electric motor including a wire connection switching mechanism for Y connection and Δ connection, it is essential to consider measures against noise components resulting from circulating current in the Δ connection state.

In order to reduce such noise components, the drive apparatus 400 for an electric motor according to the first embodiment includes the noise suppression unit 110 between the connection points α, β, and γ and the alternating-current output terminals 101 as illustrated in FIG. 1. By providing the noise suppression unit 110 between the connection points α, β, and γ and the alternating-current output terminals 101, the EMI noise propagated between the inverter 60 and the electric motor 130 is suppressed in either the Δ connection state or the Y connection state.

In either the Δ connection state or the Y connection state, the switching noise that occurs when the inverter 60 is driven is a dominant factor of the EMI noise between the inverter 60 and the electric motor 130. By providing the noise suppression unit 110 between the connection points α, β, and γ and the alternating-current output terminals 101, the switching noise that occurs when the inverter 60 is driven can be effectively suppressed.

In the drive apparatus 400 for an electric motor according to the first embodiment, the noise suppression unit 110 is provided on the alternating-current wires 140. Therefore, the number of attachment places for EMI countermeasure components is small, as compared with the case where an EMI countermeasure component is attached to each of the alternating-current wires 140, the alternating-current wires 150, and the alternating-current wires 160. Therefore, a simplified EMI countermeasure structure can be established while preventing an increase in the size and manufacturing cost of the drive apparatus 400 for an electric motor. Since the number of attachment places for EMI countermeasure components is small, the characteristic deterioration of EMI countermeasure components and the frequency of failures in EMI countermeasure components are reduced. Owing to the simplified EMI countermeasure structure, the installation space for the drive apparatus 400 for an electric motor in the housing of the outdoor unit can be easily secured, making it unnecessary to take a measure such as enlarging the housing of the outdoor unit or rearranging the components inside the outdoor unit. Therefore, an increase in the size or manufacturing cost of the outdoor unit can be prevented. Since the number of attachment places for EMI countermeasure components is small, an increase in the loss due to EMI countermeasure components described above can be prevented, and the electric motor 130 can be driven with high efficiency and high output. Since the number of attachment places for EMI countermeasure components is small, an increase in the area for attaching EMI countermeasure components to the housing of the outdoor unit is prevented. Since the number of attachment places for EMI counter-measure components is small, the length of wires wound on EMI countermeasure components can be shortened, and an increase in wiring length can be prevented. Specifically, in a case where a ferrite core is used as the noise suppression unit 110, wires are wound multiple times on the ferrite core. In a case where the noise suppression unit 110 is a ferrite core, the wires correspond to the alternating-current wires 140. As the number of ferrite cores that are EMI countermeasure components decreases, the length of wires wound on ferrite cores decreases, so that the material cost of wires and the cost of wiring operation are reduced. As the length of wires wound on ferrite cores decreases, the impedance of wires is reduced, and the electric motor 130 can be driven with high efficiency and high output.

Next, with reference to FIG. 5, a method of suppressing the noise resulting from circulating current in the Δ connection state will be described.

Figure 5:
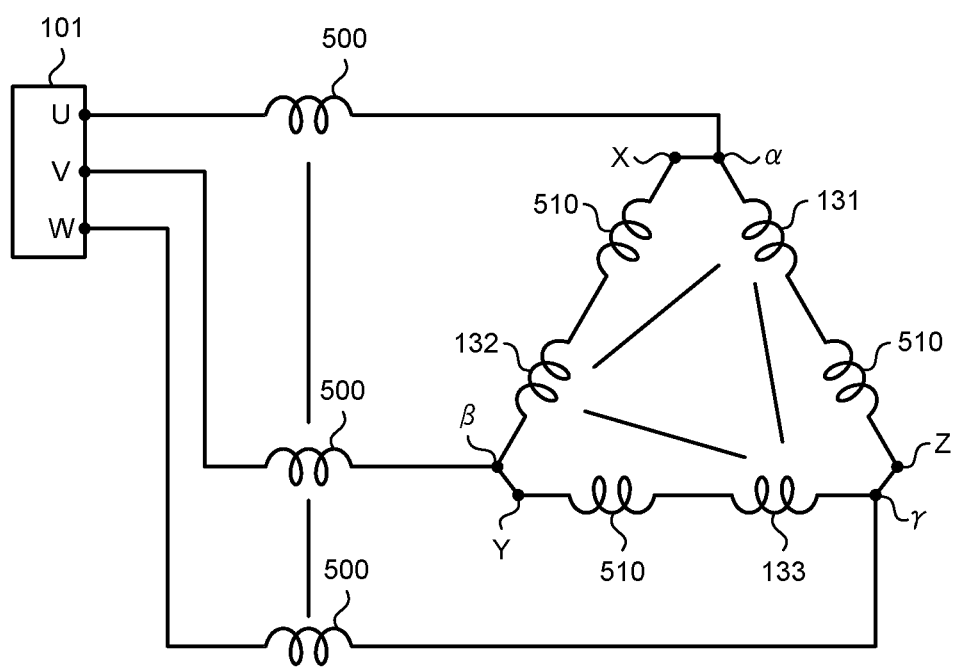
FIG. 5 is a second diagram illustrating windings whose wire connection state is set to Δ connection by the drive apparatus for an electric motor according to the first embodiment.

FIG. 5 is a second diagram illustrating windings whose wire connection state is set to Δ connection by the drive apparatus for an electric motor according to the first embodiment. In FIG. 5, the inductances 500 which are formed in the alternating-current wires 140 by the noise suppression unit 110 made of a magnetic body and inductances 510 are illustrated. The inductances 510 are inductances formed by an additional noise suppression unit 110 that can be provided on wires between the connection points α, β, and γ and the contacts a. When the additional noise suppression unit 110 is provided in this manner, the inductances 510 are formed between the connection points α, β, and γ and the respective windings of the electric motor 130 in the Δ connection state. Therefore, the noise resulting from the circulating current flowing between the three-phase windings of the electric motor 130 can be suppressed.

In the first embodiment, an additional noise suppression unit 110 may be provided on the wires extending from the terminal 210 to the contacts b of the relay substrate 200, or an additional noise suppression unit 110 may be provided on the wires 160b extending from the contacts c to the input terminals X, Y, and Z. By providing the additional noise suppression unit 110 in this manner, inductances are formed in the wires 160b by the additional noise suppression unit in the Δ connection state. Therefore, noise components resulting from the circulating current flowing between the three-phase windings are suppressed. On the other hand, in the Y connection state, the inductances 500 illustrated in FIG. 2 are formed in the alternating-current wires 140, and inductances are further formed in the wires between the terminal 210 and the input terminals X, Y, and Z by the additional noise suppression unit. Accordingly, the EMI noise suppression effect can be enhanced by the total inductance of these inductances.

Note that the alternating-current wires 140 may be directly connected to the alternating-current wires 63 which are pattern wires of the inverter substrate 100. That is, the alternating-current wires 140 may be connected to the alternating-current wires 63 without passing through the alternating-current output terminals 101. This wiring is also based on the premise in the first embodiment that one noise suppression unit 110 is provided between the inverter 60 and the connection points α, β, and γ. Since the noise suppression unit 110 is provided on the alternating-current wires 140, it is not necessary to provide an EMI countermeasure structure on pattern wires on the inverter substrate 100. Therefore, the pattern wiring length can be shortened and the wiring structure on the inverter substrate 100 can be simplified significantly, as compared with the case where an EMI countermeasure structure is provided on pattern wires.

In a case where the noise suppression unit 110 is provided on the alternating-current wires 140, it is desirable that the noise suppression unit 110 be provided near the inverter substrate 100. That is, it is desirable that the distance from the noise suppression unit 110 to the electric motor 130 on the alternating-current wires 140 be longer than the distance from the noise suppression unit 110 to the inverter 60 on the alternating-current wires 140. Consequently, the noise suppression unit 110 can be kept away from the electric motor 130. Heat and vibration that occur when the electric motor 130 is driven may accelerate the characteristic deterioration of the noise suppression unit 110 and increase the frequency of failures in the noise suppression unit 110. Keeping the noise suppression unit 110 away from the electric motor 130 can slow the characteristic deterioration of the noise suppression unit 110 and reduce the frequency of failures in the noise suppression unit 110.

The drive apparatus 400 for an electric motor according to the first embodiment may include a mechanism that can switch the windings from Y connection to Y connection and can switch the windings from Δ connection to Δ connection. Specific examples thereof include a mechanism for adjusting the number of turns of the three-phase windings by providing changeover switches in the middle of the windings and operating the changeover switches in accordance with the required load and a mechanism for adjusting the number of turns of the three-phase windings by providing two or more windings in each phase and connecting the two or more windings together in accordance with the required load. However, any configuration can be used as long as the effect of switching from Y connection to Y connection and the effect of switching from Δ connection to Δ connection can be achieved.

Second Embodiment

Figure 6:
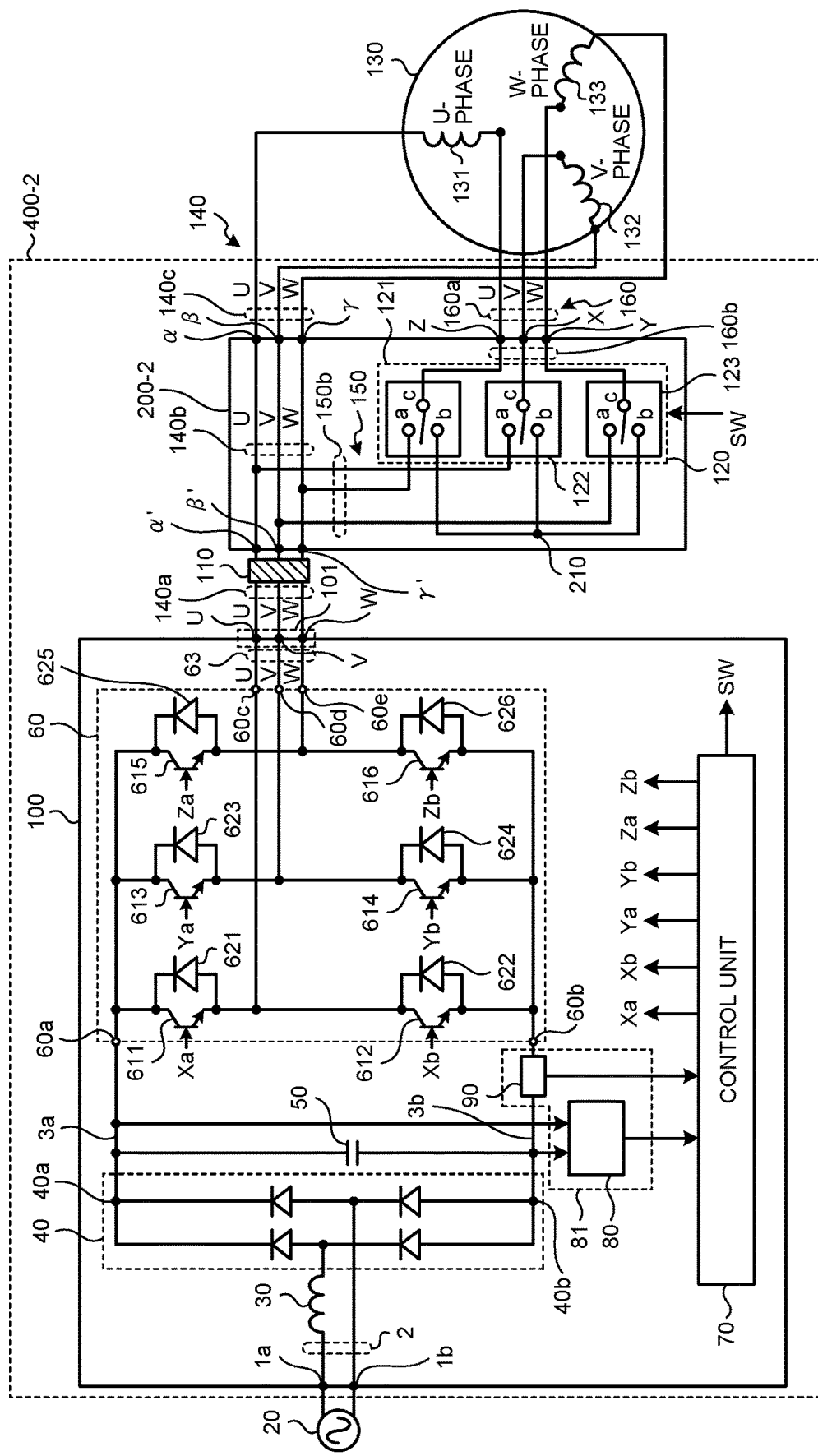
FIG. 6 is a diagram illustrating an exemplary configuration of a drive apparatus for an electric motor according to a second embodiment.

FIG. 6 is a diagram illustrating an exemplary configuration of a drive apparatus for an electric motor according to a second embodiment. A drive apparatus 400-2 for an electric motor according to the second embodiment includes a relay substrate 200-2 instead of the relay substrate 200. The alternating-current wires 140 include alternating-current wires 140a, alternating-current wires 140b, and alternating-current wires 140c. The other configuration is the same as or equivalent to the configuration of the first embodiment. The same or equivalent components are denoted by the same reference signs, and redundant descriptions are omitted.

The wire connection switching unit 120 and the alternating-current wires 140b are provided on the relay substrate 200-2. The alternating-current wires 140b are pattern wires formed on the mounting surface of the relay substrate 200-2. Ends on one side of the alternating-current wires 140b are connected to ends on one side of the alternating-current wires 140a. The alternating-current wires 140a are intersubstrate wires provided between the inverter substrate 100 and the relay substrate 200-2. The connection point of the U-phase alternating-current wire 140b and the U-phase alternating-current wire 140a is a connection point α'. The connection point of the V-phase alternating-current wire 140b and the V-phase alternating-current wire 140a is indicated by reference sign β'. The connection point of the W-phase alternating-current wire 140b and the W-phase alternating-current wire 140a is indicated by reference sign γ'. The other end of the U-phase alternating-current wire 140a is connected to the U-phase alternating-current output terminal 101. The other end of the V-phase alternating-current wire 140a is connected to the V-phase alternating-current output terminal 101. The other end of the W-phase alternating-current wire 140a is connected to the W-phase alternating-current output terminal 101. The noise suppression unit 110 is provided on the alternating-current wires 140a.

End on the other side of the alternating-current wires 140b are connected to ends on one side of the alternating-current wires 140c. The alternating-current wires 140c are electric motor wires provided between the relay substrate 200-2 and the windings of the electric motor 130. The connection point of the U-phase alternating-current wire 140b and the U-phase alternating-current wire 140c is indicated by reference sign α. The connection point of the V-phase alternating-current wire 140b and the V-phase alternating-current wire 140c is indicated by reference sign β. The connection point of the W-phase alternating-current wire 140b and the W-phase alternating-current wire 140c is indicated by reference sign γ. The other end of the U-phase alternating-current wire 140c is connected to one end of the U-phase winding 131. The other end of the V-phase alternating-current wire 140c is connected to one end of the V-phase winding 132. The other end of the W-phase alternating-current wire 140c is connected to one end of the W-phase winding 133.

One end of the W-phase wire 150b of the alternating-current wires 150 is connected to the W-phase alternating-current wire 140b. The other end of the W-phase wire 150b is connected to the contact a of the switch 121. The contact a of the switch 121 is connected to the W-phase alternating-current wire 140b via the W-phase wire 150b. One end of the U-phase wire 150b of the alternating-current wires 150 is connected to the U-phase alternating-current wire 140b. The other end of the U-phase wire 150b is connected to the contact a of the switch 122. The contact a of the switch 122 is connected to the U-phase alternating-current wire 140b via the U-phase wire 150b. One end of the V-phase wire 150b of the alternating-current wires 150 is connected to the V-phase alternating-current wire 140b. The other end of the V-phase wire 150b is connected to the contact a of the switch 123. The contact a of the switch 123 is connected to the V-phase alternating-current wire 140b via the V-phase wire 150b.

In the second embodiment, the electric motor 130 is connected to the inverter substrate 100 via the alternating-current wires 140b on the relay substrate 200-2. Since the length of the alternating-current wires 140 of the first embodiment is longer than the length of the alternating-current wires 140c of the second embodiment, the first embodiment requires, in some cases, a terminal block or swage for relaying the alternating-current wires 140 on the outside of the inverter substrate 100. The terminal block is a terminal block including a primary side terminal to which wires extending from the inverter substrate 100 are connected and a secondary terminal to which wires extending from the electric motor 130 are connected. The swage is a metal sleeve into which the end of wires extending from the inverter substrate 100 and the end of wires extending from the electric motor 130 are inserted. In the second embodiment, since the length of the alternating-current wires 140c is shorter than that of the alternating-current wires 140 of the first embodiment, the inverter substrate 100 and the electric motor 130 can be electrically connected without using a terminal block or swage. Therefore, the second embodiment can achieve the effect of simplifying the wiring structure in addition to the effects of the first embodiment. In the second embodiment, the wiring length of the alternating-current wires 140 is shorter than that in the first embodiment, and accordingly the drive apparatus 400-2 for an electric motor can be reduced in weight.

In the second embodiment, since the noise suppression unit 110 is provided on the alternating-current wires 140a, the EMI noise propagated between the inverter 60 and the electric motor 130 is suppressed in either the Δ connection state or the Y connection state, as described in the first embodiment. By providing the noise suppression unit 110 on the alternating-current wires 140a, the switching noise that occurs when the inverter 60 is driven can be effectively suppressed. Since the noise suppression unit 110 is provided on the alternating-current wires 140a, the number of attachment places for EMI countermeasure components is small, as compared with the case where EMI countermeasure components are attached to both the alternating-current wires 140 and the alternating-current wires 160. Therefore, a simplified EMI countermeasure structure can be established while preventing an increase in the size and manufacturing cost of the drive apparatus 400-2 for an electric motor.

In the second embodiment, an additional noise suppression unit 110 may be provided on wires between the connection points α, β, and γ and the contacts a. The wires between the connection points α, β, and γ and the contacts a may be the alternating-current wires 140b or the wires 150b. By providing the additional noise suppression unit 110 in this manner, inductances are formed in at least one of the alternating-current wires 140b and the wires 150b by the additional noise suppression unit in the Δ connection state. Therefore, noise components resulting from the circulating current flowing between the three-phase windings are suppressed.

In the second embodiment, an additional noise suppression unit 110 may be provided on the wires extending from the terminal 210 to the contacts b of the relay substrate 200-2, or an additional noise suppression unit 110 may be provided on the wires 160b extending from the contacts c to the input terminals X, Y, and Z. By providing the additional noise suppression unit in this manner, inductances are formed in the wires 160b by the additional noise suppression unit in the Δ connection state. Therefore, noise components resulting from the circulating current flowing between the three-phase windings are suppressed. On the other hand, in the Y connection state, the inductances 500 illustrated in FIG. 2 are formed in the alternating-current wires 140a, and inductances are further formed in the wires between the terminal 210 and the input terminals X, Y, and Z by the additional noise suppression unit. As a result, the EMI noise suppression effect can be enhanced by the total inductance of these inductances.

Note that the alternating-current wires 140a may be directly connected to the alternating-current wires 63 which are pattern wires of the inverter substrate 100. That is, the alternating-current wires 140a may be connected to the alternating-current wires 63 without passing through the alternating-current output terminals 101. This wiring is also based on the premise in the second embodiment that one noise suppression unit 110 is provided on the alternating-current wires 140a. Since the noise suppression unit 110 is provided on the alternating-current wires 140a, it is not necessary to provide an EMI countermeasure structure on pattern wires on the inverter substrate 100. Therefore, the pattern wiring length can be shortened and the wiring structure on the inverter substrate 100 can be simplified significantly, as compared with the case where an EMI countermeasure structure is provided on pattern wires.

In a case where the noise suppression unit 110 is provided on the alternating-current wires 140a, it is desirable that the noise suppression unit 110 be provided near the inverter substrate 100. That is, it is desirable that the distance from the noise suppression unit 110 to the relay substrate 200-2 on the alternating-current wires 140a be longer than the distance from the noise suppression unit 110 to the inverter 60 on the alternating-current wires 140a. Consequently, the noise suppression unit 110 can be kept away from the electric motor 130. Keeping the noise suppression unit 110 away from the electric motor 130 can slow the characteristic deterioration of the noise suppression unit 110 and reduce the frequency of failures in the noise suppression unit 110.

The drive apparatus 400-2 for an electric motor according to the second embodiment may include a mechanism that can switch the windings from Y connection to Y connection and can switch the windings from Δ connection to Δ connection, as described in the first embodiment.

Third Embodiment

Figure 7:
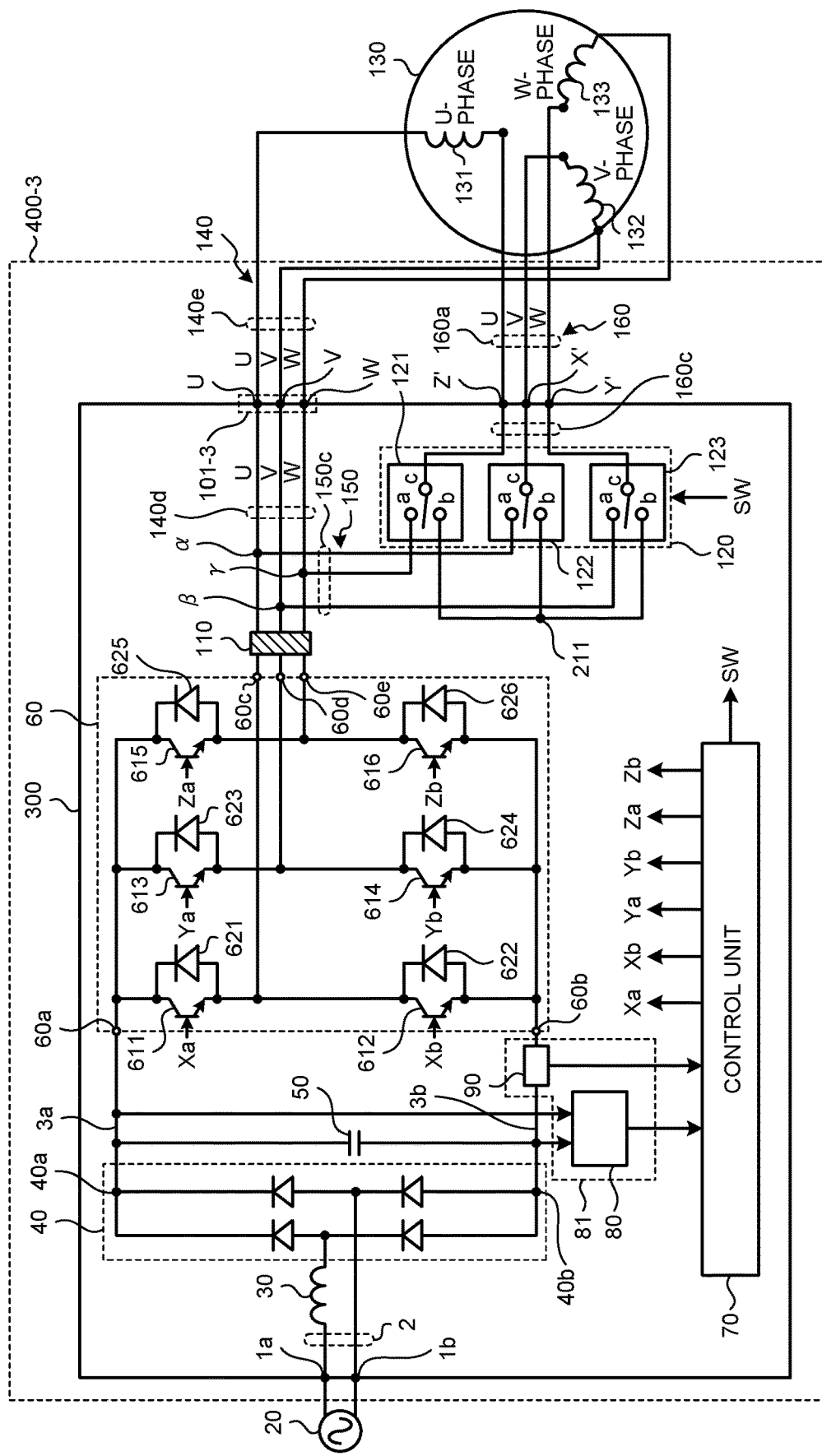
FIG. 7 is a diagram illustrating an exemplary configuration of a drive apparatus for an electric motor according to a third embodiment.

FIG. 7 is a diagram illustrating an exemplary configuration of a drive apparatus for an electric motor according to a third embodiment. A drive apparatus 400-3 for an electric motor according to the third embodiment includes a power substrate 300 as the first substrate instead of the inverter substrate 100 and the relay substrate 200. The power substrate 300 includes components provided on the inverter substrate 100 and components provided on the relay substrate 200. The alternating-current wires 140 include alternating-current wires 140d and alternating-current wires 140e. The other configuration is the same as or equivalent to the configuration of the first embodiment. The same or equivalent components are denoted by the same reference signs, and redundant descriptions are omitted.

The alternating-current wires 140d are pattern wires formed on the mounting surface of the power substrate 300. One end of the U-phase alternating-current wire 140d is connected to one end of the output terminal 60c of the inverter 60. One end of the V-phase alternating-current wire 140d is connected to one end of the output terminal 60d of the inverter 60. One end of the W-phase alternating-current wire 140d is connected to one end of the output terminal 60e of the inverter 60. The noise suppression unit 110 is provided on the alternating-current wires 140d.

The other end of the U-phase alternating-current wire 140d is connected to a U-phase alternating-current output terminal 101-3. Alternating-current output terminals 101-3 are terminals provided on the mounting surface of the power substrate 300. The other end of the V-phase alternating-current wire 140d is connected to the V-phase alternating-current output terminal 101-3. The other end of the W-phase alternating-current wire 140d is connected to the W-phase alternating-current output terminal 101-3.

The alternating-current output terminals 101-3 are connected to the electric motor 130 via the alternating-current wires 140e. The alternating-current wires 140e are wires provided between the power substrate 300 and the windings of the electric motor 130. One end of the U-phase alternating-current wire 140e is connected to the U-phase alternating-current output terminal 101-3. The other end of the U-phase alternating-current wire 140e is connected to one end of the U-phase winding 131. One end of the V-phase alternating-current wire 140e is connected to the V-phase alternating-current output terminal 101-3. The other end of the V-phase alternating-current wire 140e is connected to one end of the V-phase winding 132. One end of the W-phase alternating-current wire 140e is connected to the W-phase alternating-current output terminal 101-3. The other end of the W-phase alternating-current wire 140e is connected to one end of the W-phase winding 133.

The contact a of the switch 121 is connected to the W-phase alternating-current wire 140d via a W-phase wire 150c of the alternating-current wires 150. Wires 150c are pattern wires formed on the mounting surface of the power substrate 300. One end of the W-phase wire 150c is connected to the W-phase alternating-current wire 140d. The other end of the W-phase wire 150c is connected to the contact a of the switch 121. The connection point of the W-phase wire 150c and the W-phase alternating-current wire 140d is indicated by reference sign γ.

The contact a of the switch 122 is connected to the U-phase alternating-current wire 140d via the U-phase wire 150c of the alternating-current wires 150. One end of the U-phase wire 150c is connected to the U-phase alternating-current wire 140d. The other end of the U-phase wire 150c is connected to the contact a of the switch 122. The connection point of the U-phase wire 150c and the U-phase alternating-current wire 140d is indicated by reference sign α.

The contact a of the switch 123 is connected to the V-phase alternating-current wire 140d via the V-phase wire 150c. One end of the V-phase wire 150c is connected to the V-phase alternating-current wire 140d. The other end of the V-phase wire 150c is connected to the contact a of the switch 123. The connection point of the V-phase wire 150c and the V-phase alternating-current wire 140d is indicated by reference sign β.

The contact b of the switch 121 is connected to a terminal 211. The terminal 211 is a terminal provided on the power substrate 300. The terminal 211 serves as a neutral point for Δ connection. The contact b of the switch 122 is connected to the terminal 211. The contact b of the switch 123 is connected to the terminal 211.

The contact c of the switch 121 is connected to an input terminal Z' via a U-phase wire 160c of the alternating-current wires 160. The alternating-current wires 160 include the wires 160a and wires 160c. One end of the U-phase wire 160a is connected to the input terminal Z'. The other end of the U-phase wire 160a is connected to the other end of the U-phase winding 131 of the electric motor 130. The wires 160c are pattern wires formed on the mounting surface of the power substrate 300. One end of the U-phase wire 160c is connected to the contact c of the switch 121. The other end of the U-phase wire 160c is connected to the input terminal Z'. The input terminal Z' is a terminal provided on the mounting surface of the power substrate 300.

The contact c of the switch 122 is connected to an input terminal X' via the V-phase wire 160c of the alternating-current wires 160. One end of the V-phase wire 160c is connected to the contact c of the switch 122. The other end of the V-phase wire 160c is connected to the input terminal X'. The input terminal X' is a terminal provided on the mounting surface of the power substrate 300. One end of the V-phase wire 160a is connected to the input terminal X'. The other end of the V-phase wire 160a is connected to the other end of the V-phase winding 132 of the electric motor 130.

The contact c of the switch 123 is connected to an input terminal Y' via the W-phase wire 160c of the alternating-current wires 160. One end of the W-phase wire 160c is connected to the contact c of the switch 123. The other end of the W-phase wire 160c is connected to the input terminal Y'. The input terminal Y' is a terminal provided on the mounting surface of the power substrate 300. One end of the W-phase wire 160*a* is connected to the input terminal Y'. The other end of the W-phase wire 160*a* is connected to the other end of the W-phase winding 133 of the electric motor 130.

In the third embodiment, the electric motor 130 is connected to the inverter 60 via the alternating-current wires 140*d* of the power substrate 300, the alternating-current wires 140*e*, and the alternating-current wires 160. The third embodiment uses a smaller number of substrates than the first embodiment by using the power substrate 300. Since the third embodiment does not require the wires 150*a*, the number of wires for connecting the inverter substrate 100 and the relay substrate 200 is reduced.

In the third embodiment, since the length of the alternating-current wires 140*e* is shorter than that of the alternating-current wires 140 of the first embodiment, the power substrate 300 and the electric motor 130 can be electrically connected without using a terminal block or swage as described above. Therefore, the third embodiment can achieve the effect of simplifying the wiring structure in addition to the effects of the first embodiment. Since the amount of usage of the alternating-current wires 140*e* is reduced, the manufacturing cost of the drive apparatus 400-3 for an electric motor can be reduced. Since the wiring length of the alternating-current wires 140*e* is shortened, the inductance components of the alternating-current wires 140*e* are reduced, and EMI noise can be reduced.

In the third embodiment, since the noise suppression unit 110 is provided on the alternating-current wires 140*d*, the EMI noise propagated between the inverter 60 and the electric motor 130 is suppressed in either the Δ connection state or the Y connection state, as described in the first embodiment. By providing the noise suppression unit 110 on the alternating-current wires 140*d*, the switching noise that occurs when the inverter 60 is driven can be effectively suppressed. Since the noise suppression unit 110 is provided on the alternating-current wires 140*d*, the number of attachment places for EMI countermeasure components is small, as compared with the case where EMI countermeasure components are attached to both the alternating-current wires 140*d* and the alternating-current wires 160. Therefore, a simplified EMI countermeasure structure can be established while preventing an increase in the size and manufacturing cost of the drive apparatus 400-3 for an electric motor.

In the third embodiment, an additional noise suppression unit 110 may be provided on the wires 150*c* between the connection points α, β, and γ and the contacts a. By providing the additional noise suppression unit 110 in this manner, inductances are formed in the wires 150*c* by the additional noise suppression unit in the Δ connection state. Therefore, noise components resulting from the circulating current flowing between the three-phase windings are suppressed.

In the third embodiment, an additional noise suppression unit 110 may be provided on the wires extending from the terminal 211 to the contacts b, or an additional noise suppression unit 110 may be provided on the wires 160*c* extending from the contacts c to the input terminals X', Y', and Z'. By providing the additional noise suppression unit in this manner, inductances are formed in the wires 160*c* by the additional noise suppression unit in the Δ connection state. Therefore, noise components resulting from the circulating current flowing between the three-phase windings are suppressed. On the other hand, in the Y connection state, the inductances 500 illustrated in FIG. 2 are formed in the alternating-current wires 140*d*, and inductances are further formed in the wires between the terminal 211 and the input terminals X', Y', and Z' by the additional noise suppression unit. As a result, the EMI noise suppression effect can be enhanced by the total inductance of these inductances.

Instead of the U-phase alternating-current wire 140*d*, the U-phase alternating-current wire 140*e* may be connected to the output terminal 60*c* of the inverter 60. Similarly, instead of the V-phase alternating-current wire 140*d*, the V-phase alternating-current wire 140*e* may be connected to the output terminal 60*d* of the inverter 60. Instead of the W-phase alternating-current wire 140*d*, the W-phase alternating-current wire 140*e* may be connected to the output terminal 60*e* of the inverter 60. This wiring is also based on the premise in the third embodiment that one noise suppression unit 110 is provided on the alternating-current wires 140*d*. Since the noise suppression unit 110 is provided on the alternating-current wires 140*d*, it is not necessary to provide an EMI countermeasure structure on pattern wires between the output terminals 60*c*, 60*d*, and 60*e* and the inverter 60. Therefore, the pattern wiring length can be shortened and the wiring structure on the power substrate 300 can be simplified significantly, as compared with the case where an EMI countermeasure structure is provided on pattern wires.

In a case where the noise suppression unit 110 is provided on the alternating-current wires 140*d*, it is desirable that the noise suppression unit 110 be provided near the inverter 60. That is, it is desirable that the distance from the noise suppression unit 110 to the alternating-current output terminals 101-3 on the alternating-current wires 140*d* be longer than the distance from the noise suppression unit 110 to the inverter 60 on the alternating-current wires 140*d*. Consequently, the noise suppression unit 110 can be kept away from the electric motor 130. Keeping the noise suppression unit 110 away from the electric motor 130 hinders the transmission of heat and vibration from the electric motor 130 to the noise suppression unit 110. Thus, the characteristic deterioration of the noise suppression unit 110 can be slowed, and the frequency of failures in the noise suppression unit 110 can be reduced.

The drive apparatus 400-3 for an electric motor according to the third embodiment may include a mechanism that can switch the windings from Y connection to Y connection and can switch the windings from Δ connection to Δ connection, as described in the first embodiment.

Fourth Embodiment

Figure 8:
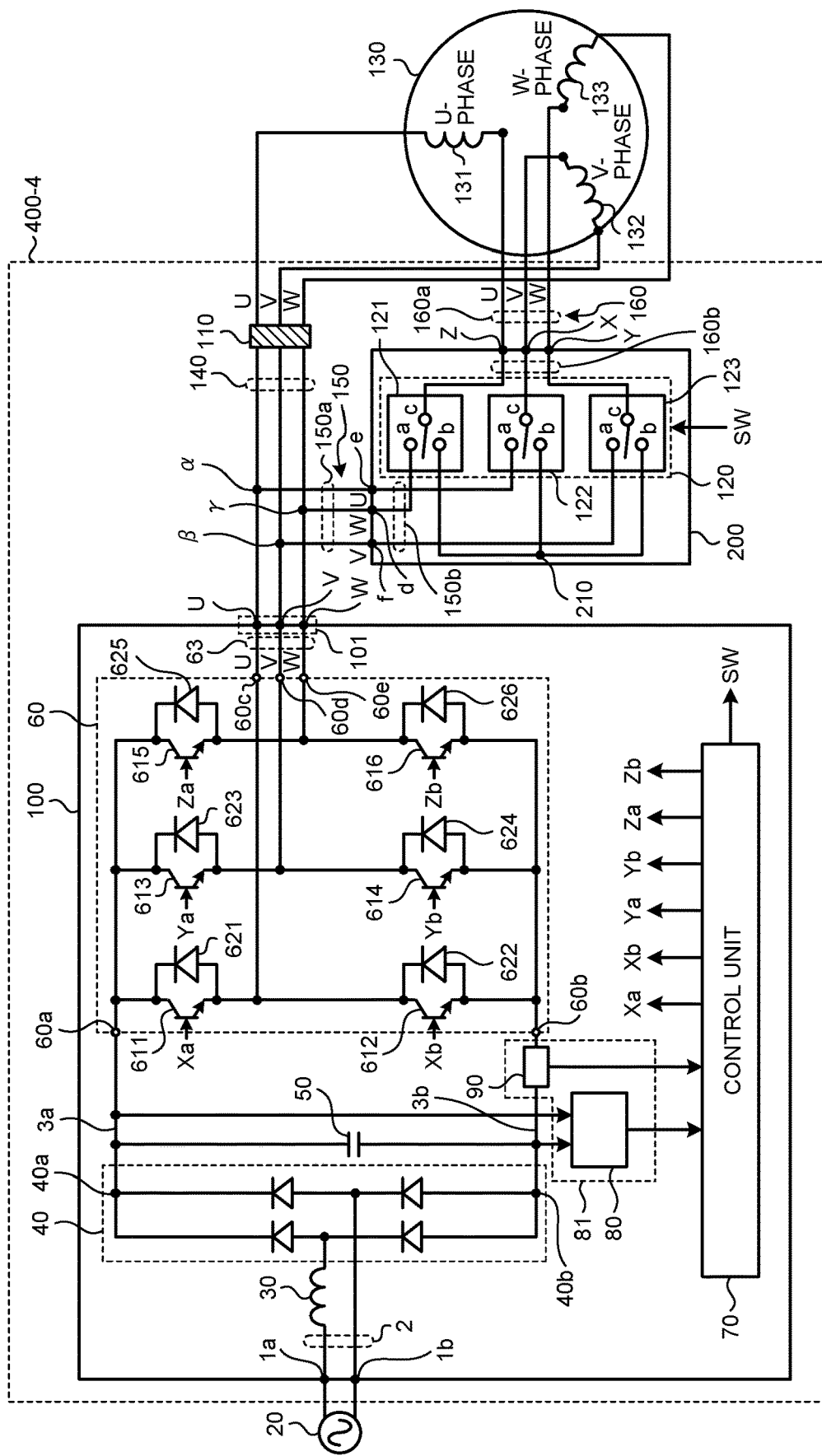
FIG. 8 is a diagram illustrating an exemplary configuration of a drive apparatus for an electric motor according to a fourth embodiment.

FIG. 8 is a diagram illustrating an exemplary configuration of a drive apparatus for an electric motor according to a fourth embodiment. In a drive apparatus 400-4 for an electric motor according to the fourth embodiment, the noise suppression unit 110 is provided between the connection points α, β, and γ and the electric motor 130 on the alternating-current wires 140 extending from the alternating-current output terminals 101 to the electric motor 130. The other configuration is the same as or equivalent to the configuration of the first embodiment. The same or equivalent components are denoted by the same reference signs, and redundant descriptions are omitted.

Figure 9:
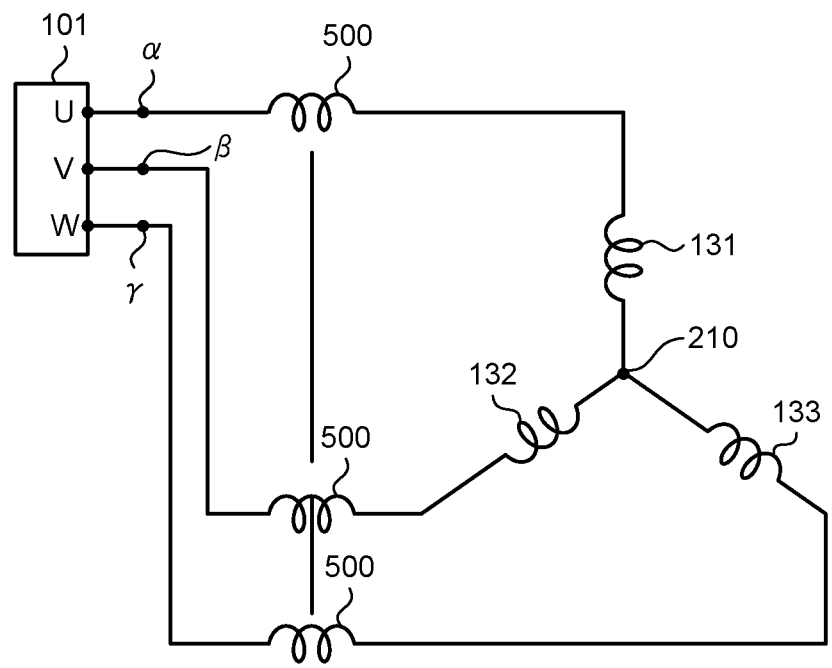
FIG. 9 is a diagram illustrating windings whose wire connection state is set to Y connection by the drive apparatus for an electric motor according to the fourth embodiment.

FIG. 9 is a diagram illustrating windings whose wire connection state is set to Y connection by the drive apparatus for an electric motor according to the fourth embodiment. The inductances 500 illustrated in FIG. 9 are inductance components that are formed in the alternating-current wires 140 between the connection points α, β, and γ and the electric motor 130 in the Y connection state in a case where the noise suppression unit 110 illustrated in FIG. 8 is a magnetic body that suppresses EMI noise. The inductances 500 suppress the EMI noise that occurs between the inverter 60 and the electric motor 130 in the Y connection state.

Figure 10:
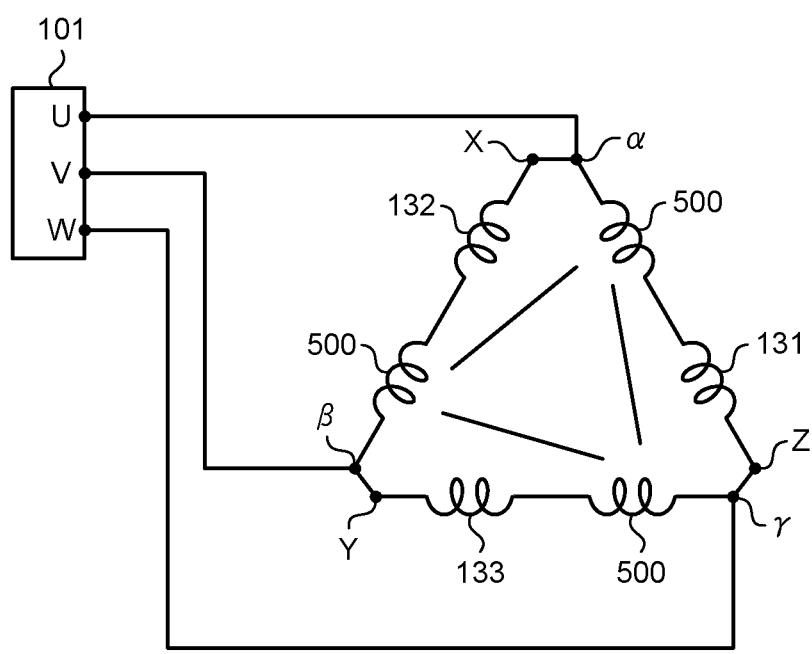
FIG. 10 is a first diagram illustrating windings whose wire connection state is set to Δ connection by the drive apparatus for an electric motor according to the fourth embodiment.

FIG. 10 is a first diagram illustrating windings whose wire connection state is set to Δ connection by the drive apparatus for an electric motor according to the fourth embodiment. The inductances 500 illustrated in FIG. 10 are inductance components that are formed between the connection points α, β, and γ and the respective windings in the Δ connection state in a case where the noise suppression unit 110 illustrated in FIG. 8 is a magnetic body that suppresses EMI noise. In the Δ connection state, the inductances 500 suppress the EMI noise that occurs between the inverter 60 and the electric motor 130, and further suppress the noise resulting from the circulating current flowing between the three-phase windings of the electric motor 130.

Thus, according to the fourth embodiment, the EMI noise propagated between the inverter 60 and the electric motor 130 is suppressed in the Y connection state. In the Δ connection state, the EMI noise propagated between the inverter 60 and the electric motor 130 is suppressed, and the noise resulting from circulating current is further suppressed. Therefore, the fourth embodiment can suppress EMI noise more significantly than the first to third embodiments.

In the drive apparatus 400-4 for an electric motor illustrated in FIG. 8, an additional noise suppression unit 110 may be provided on the alternating-current wires 140 between the alternating-current output terminals 101 and the connection points α, β, and γ. By providing the additional noise suppression unit in this manner, the inductances 500 and the inductances by the additional noise suppression unit are formed in the alternating-current wires 140b in the Y connection state. As a result, the total inductance of the inductances 500 and the inductances by the additional noise suppression unit suppresses EMI noise significantly, as compared with the case where the noise suppression unit 110 is provided only on the alternating-current wires 140.

Figure 11:
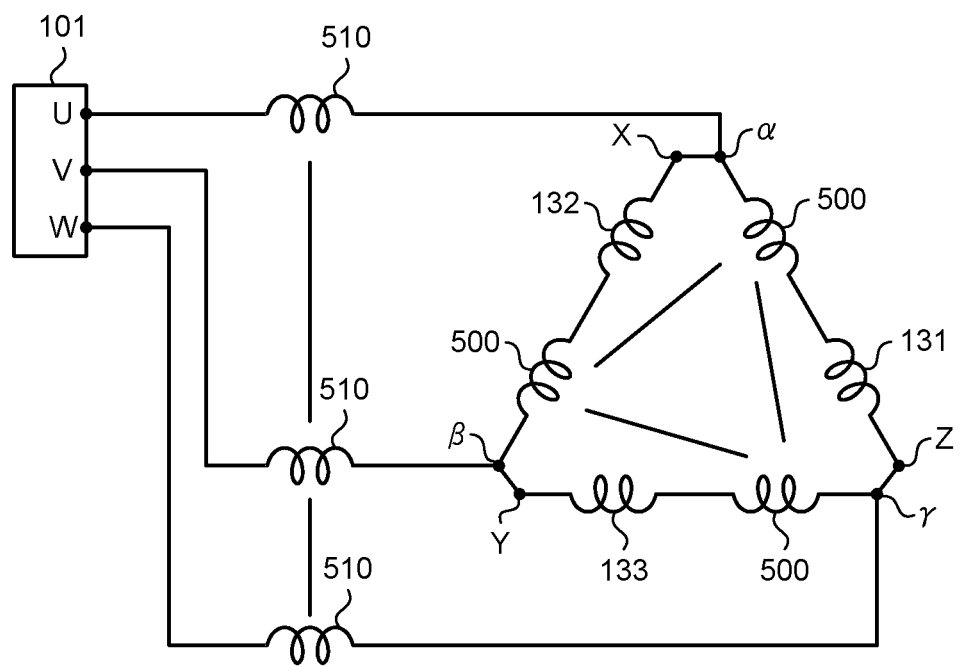
FIG. 11 is a second diagram illustrating windings whose wire connection state is set to Δ connection by the drive apparatus for an electric motor according to the fourth embodiment.

FIG. 11 is a second diagram illustrating windings whose wire connection state is set to Δ connection by the drive apparatus for an electric motor according to the fourth embodiment. In FIG. 11, the inductances 500 and the inductances 510 are illustrated. The inductances 500 are the same as the inductances 500 illustrated in FIG. 10. That is, the inductances 500 are inductance components formed between the connection points α, β, and γ and the respective windings in the Δ connection state by the noise suppression unit 110 illustrated in FIG. 8. The inductances 510 are inductances formed by an additional noise suppression unit 110 that can be provided on wires between the alternating-current output terminals 101 and the connection points α, β, and γ. When the additional noise suppression unit 110 is provided in this manner, the inductances 500 are formed between the connection points α, β, and γ and the respective windings of the electric motor 130 in the Δ connection state, and the inductances 510 are further formed in the alternating-current wires 140. Therefore, the inductances 500 suppress the EMI noise propagated between the inverter 60 and the electric motor 130 and the EMI noise resulting from the circulating current between the three-phase windings of the electric motor 130. Furthermore, the inductances 510 suppress the EMI noise propagated between the inverter 60 and the electric motor 130.

In the fourth embodiment, an additional noise suppression unit 110 may be provided on the wires 150a between the connection points α, β, and γ and the contacts a. When the additional noise suppression unit 110 is provided in this manner, the above-mentioned inductances 500 and the inductances by the additional noise suppression unit are formed in the wires between the connection points α, β, and γ and the respective windings of the electric motor 130 in the Δ connection state. Therefore, the EMI noise propagated between the inverter 60 and the electric motor 130 and the EMI noise resulting from the circulating current between the three-phase windings of the electric motor 130 are suppressed.

In the fourth embodiment, an additional noise suppression unit 110 may be provided on the wires extending from the terminal 210 to the contacts b of the relay substrate 200, or an additional noise suppression unit 110 may be provided on the wires 160b extending from the contacts c to the input terminals X, Y, and Z. When the additional noise suppression unit 110 is provided in this manner, the inductances 500 are formed in the wires between the connection points α, β, and γ and the respective windings of the electric motor 130 in the Y connection state, and inductances are further formed in the wires 160b by the additional noise suppression unit. Therefore, the total inductance of the inductances 500 and the inductances by the additional noise suppression unit 110 is formed. Thus, EMI noise can be suppressed significantly, as compared with the case where the noise suppression unit 110 is provided only on the alternating-current wires 140.

Since the additional noise suppression unit 110 is provided in this manner, the inductances 500 and the inductances 510 are formed in the wires between the connection points α, β, and γ and the respective windings of the electric motor 130 in the Δ connection state, as illustrated in FIG. 11. Therefore, the EMI noise propagated between the inverter 60 and the electric motor 130 and the EMI noise resulting from the circulating current between the three-phase windings of the electric motor 130 are suppressed.

Note that the alternating-current wires 140 may be directly connected to the alternating-current wires 63 which are pattern wires of the inverter substrate 100 illustrated in FIG. 8. That is, the alternating-current wires 140 may be connected to the alternating-current wires 63 without passing through the alternating-current output terminals 101. This wiring is also based on the premise in the fourth embodiment that one noise suppression unit 110 is provided on the wires between the connection points α, β, and γ and the electric motor 130. Since the noise suppression unit 110 is provided on the alternating-current wires 140, it is not necessary to provide an EMI countermeasure structure on pattern wires of the inverter substrate 100. Therefore, the pattern wiring length can be shortened and the wiring structure on the inverter substrate 100 can be simplified significantly, as compared with the case where an EMI countermeasure structure is provided on pattern wires.

In a case where the noise suppression unit 110 is provided on the alternating-current wires 140, it is desirable that the noise suppression unit 110 be provided near the connection points α, β, and γ. That is, it is desirable that the distance from the noise suppression unit 110 to the electric motor 130 on the alternating-current wires 140 be longer than the distance from the noise suppression unit 110 to the connection points α, β, and γ on the alternating-current wires 140. Consequently, the noise suppression unit 110 can be kept away from the electric motor 130. Keeping the noise suppression unit 110 away from the electric motor 130 can slow the characteristic deterioration of the noise suppression unit 110 and reduce the frequency of failures in the noise suppression unit 110.

The drive apparatus 400-4 for an electric motor according to the fourth embodiment may include a mechanism that can

Fifth Embodiment

Figure 12:
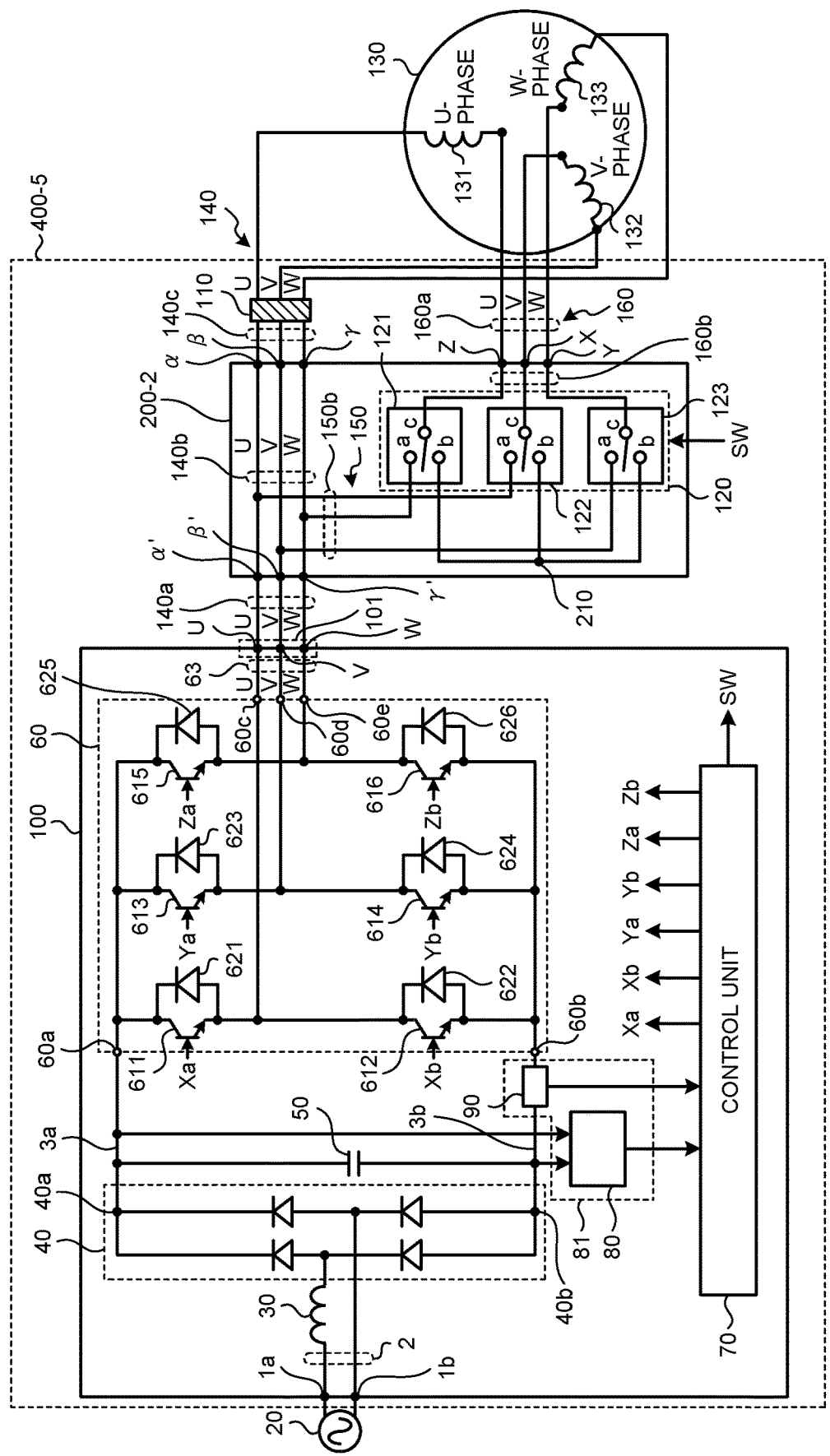
FIG. 12 is a diagram illustrating an exemplary configuration of a drive apparatus for an electric motor according to a fifth embodiment.

FIG. 12 is a diagram illustrating an exemplary configuration of a drive apparatus for an electric motor according to a fifth embodiment. In a drive apparatus 400-5 for an electric motor according to the fifth embodiment, the noise suppression unit 110 is provided on the alternating-current wires 140c extending from the relay substrate 200-2 to the electric motor 130. The other configuration is the same as or equivalent to the configuration of the second embodiment. The same or equivalent components are denoted by the same reference signs, and redundant descriptions are omitted.

In the fifth embodiment, since the length of the alternating-current wires 140c is shorter than that of the alternating-current wires 140 of the fourth embodiment, the inverter substrate 100 and the electric motor 130 can be electrically connected without using a terminal block or swage as described above. Therefore, the fifth embodiment can achieve the effect of simplifying the wiring structure in addition to the effects of the fourth embodiment.

In the fifth embodiment, since the noise suppression unit 110 is provided on the alternating-current wires 140c, inductances are formed between the connection points α, β, and γ and the respective windings of the electric motor 130 in the Y connection state by the noise suppression unit 110. Therefore, the EMI noise propagated between the connection points α, β, and γ and the respective windings of the electric motor 130 is suppressed. On the other hand, in the Δ connection state, inductances are formed between the connection points α, β, and γ and the respective windings of the electric motor 130 by the noise suppression unit 110. In this case, the inductances suppress the EMI noise propagated between the connection points α, β, and γ and the electric motor 130, and further suppress the EMI noise resulting from the circulating current between the three-phase windings of the electric motor 130.

In either the Δ connection state or the Y connection state, the switching noise that occurs when the inverter 60 is driven is a dominant factor of the EMI noise between the inverter 60 and the electric motor 130. By providing the noise suppression unit 110 between the connection points α, β, and γ and the electric motor 130, the EMI noise that occurs when the inverter 60 is driven can be effectively suppressed.

In the fifth embodiment, the noise suppression unit 110 is provided on the alternating-current wires 140c. Therefore, the number of attachment places for EMI countermeasure components is small, as compared with the case where EMI countermeasure components are attached to both the alternating-current wires 140c and the alternating-current wires 160. Therefore, a simplified EMI countermeasure structure can be established while preventing an increase in the size and manufacturing cost of the drive apparatus 400-5 for an electric motor. Since the number of attachment places for EMI countermeasure components is small, the characteristic deterioration of EMI countermeasure components and the frequency of failures in EMI countermeasure components are reduced.

Owing to the simplified EMI countermeasure structure, the installation space for the drive apparatus 400-5 for an electric motor in the housing of the outdoor unit can be easily secured, making it unnecessary to take a measure such as enlarging the housing of the outdoor unit or rearranging the components inside the outdoor unit. Therefore, an increase in the size or manufacturing cost of the outdoor unit can be prevented. Since the number of attachment places for EMI countermeasure components is small, an increase in the loss due to EMI countermeasure components can be prevented, and the electric motor 130 can be driven with high efficiency and high output. In the fifth embodiment, the wiring length of the alternating-current wires 140 is shorter than that in the fourth embodiment, and accordingly the drive apparatus 400-5 for an electric motor can be reduced in weight.

In the fifth embodiment, an additional noise suppression unit 110 may be provided on the alternating-current wires 140a. By providing the additional noise suppression unit 110 in this manner, the inductances 500 illustrated in FIG. 9 are formed in the alternating-current wires 140c in the Y connection state. Inductances are further formed in the alternating-current wires 140a by the additional noise suppression unit. Therefore, the EMI noise propagated between the alternating-current output terminals 101 and the electric motor 130 is suppressed by the total inductance of the inductances 500 and the inductances by the additional noise suppression unit.

Since the additional noise suppression unit 110 is provided in this manner, in the Δ connection state, the inductances 500 are formed in the wires between the connection points α, β, and γ and the respective windings of the electric motor 130, and the inductances 510 are formed in the wires between the alternating-current output terminals 101 and the electric motor 130, as illustrated in FIG. 11. Therefore, the inductances 500 suppress the EMI noise propagated between the inverter 60 and the electric motor 130 and the EMI noise resulting from the circulating current between the three-phase windings of the electric motor 130. Furthermore, the inductances 510 suppress the EMI noise propagated between the inverter 60 and the electric motor 130.

In the fifth embodiment, an additional noise suppression unit 110 may be provided on wires between the connection points α, β, and γ and the contacts a. The wires between the connection points α, β, and γ and the contacts a may be the alternating-current wires 140b or the wires 150b. By providing the additional noise suppression unit 110 in this manner, in the Δ connection state, the above-mentioned inductances 500 are formed, and inductances are further formed in at least one of the alternating-current wires 140b and the wires 150b by the additional noise suppression unit. The total inductance of these inductances suppresses the EMI noise propagated between the inverter 60 and the electric motor 130 and the EMI noise resulting from the circulating current between the three-phase windings of the electric motor 130.

In the fifth embodiment, an additional noise suppression unit 110 may be provided on the wires extending from the terminal 210 to the contacts b of the relay substrate 200-2, or an additional noise suppression unit 110 may be provided on the wires 160b extending from the contacts c to the input terminals X, Y, and Z. When the noise suppression unit is provided in this manner, the inductances 510 are formed in the wires between the connection points α, β, and γ and the respective windings of the electric motor 130 in the Δ connection state, and inductances are further formed in the wires 160b by the additional noise suppression unit. Therefore, the EMI noise propagated between the connection points α, β, and γ and the respective windings of the electric motor 130 is suppressed by the total inductance of the inductances 510 and the inductances by the additional noise suppression unit. On the other hand, in the Y connection state, the inductances 500 illustrated in FIG. 11 are formed in the wires between the connection points α, β, and γ and the respective windings of the electric motor 130, and inductances are further formed in the wires between the connection points α, β, and γ and the respective windings of the electric motor 130 by the additional noise suppression unit provided between the terminal 210 and the input terminals X, Y, and Z. Therefore, the total inductance of the inductances 500 and the inductances by the additional noise suppression unit suppresses the EMI noise propagated between the inverter 60 and the electric motor 130, and further suppresses the noise resulting from the circulating current flowing between the three-phase windings of the electric motor 130.

Note that the alternating-current wires 140a may be directly connected to the alternating-current wires 63 of the inverter substrate 100. That is, the alternating-current wires 140a may be connected to the alternating-current wires 63 without passing through the alternating-current output terminals 101. This wiring is also based on the premise in the fifth embodiment that one noise suppression unit 110 is provided on the alternating-current wires 140c. Since the noise suppression unit 110 is provided on the alternating-current wires 140c, it is not necessary to provide an EMI countermeasure structure on pattern wires on the inverter substrate 100. Therefore, the pattern wiring length can be shortened and the wiring structure on the inverter substrate 100 can be simplified significantly, as compared with the case where an EMI countermeasure structure is provided on pattern wires.

In a case where the noise suppression unit 110 is provided on the alternating-current wires 140c, it is desirable that the noise suppression unit 110 be provided near the relay substrate 200-2. That is, it is desirable that the distance from the noise suppression unit 110 to the electric motor 130 on the alternating-current wires 140c be longer than the distance from the noise suppression unit 110 to the relay substrate 200-2 on the alternating-current wires 140c. Consequently, the noise suppression unit 110 can be kept away from the electric motor 130. Keeping the noise suppression unit 110 away from the electric motor 130 can slow the characteristic deterioration of the noise suppression unit 110 and reduce the frequency of failures in the noise suppression unit 110.

The drive apparatus 400-5 for an electric motor according to the fifth embodiment may include a mechanism that can switch the windings from Y connection to Y connection and can switch the windings from Δ connection to Δ connection, as described in the first embodiment.

Sixth Embodiment

Figure 13:
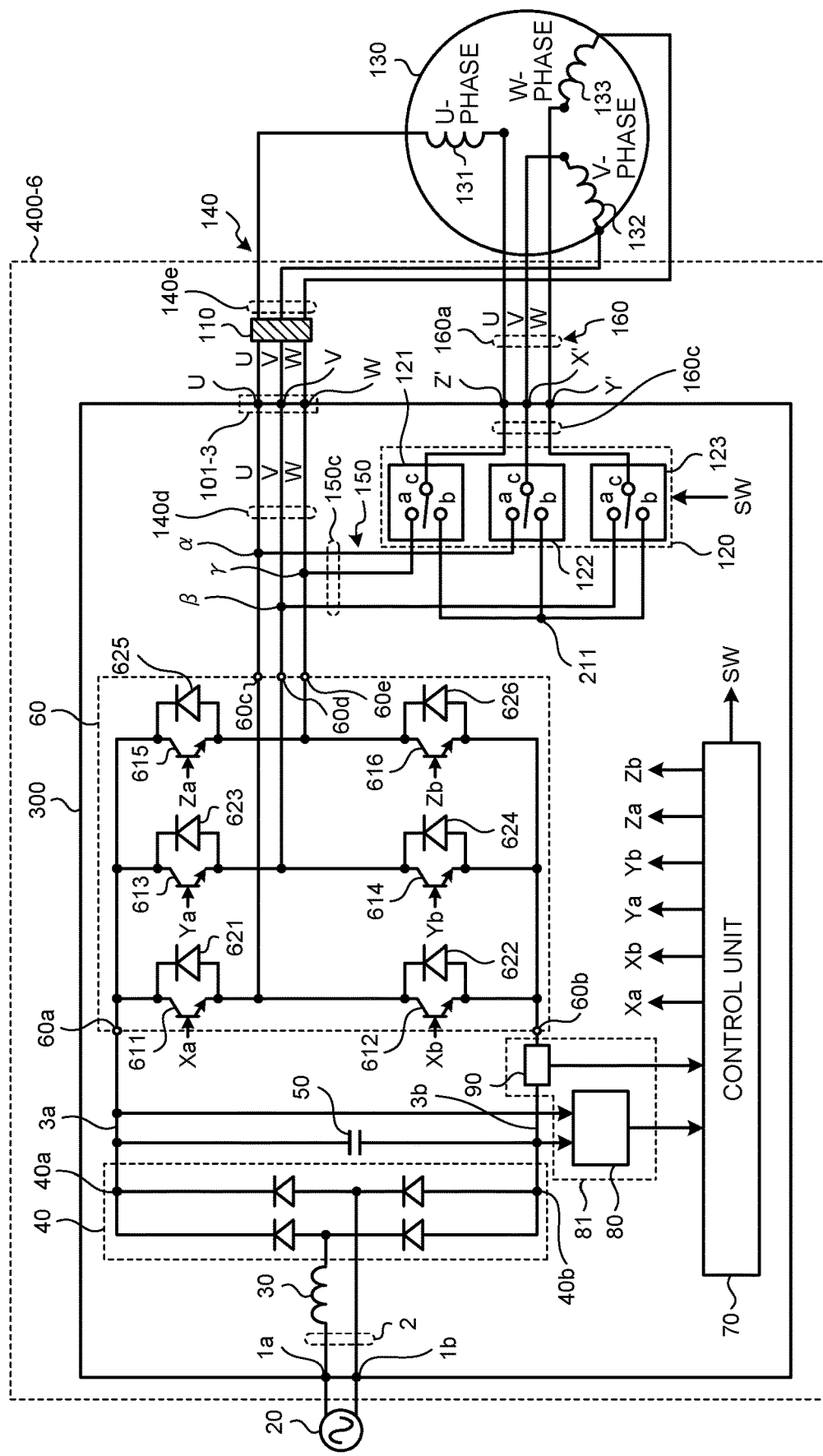
FIG. 13 is a diagram illustrating an exemplary configuration of a drive apparatus for an electric motor according to a sixth embodiment.

FIG. 13 is a diagram illustrating an exemplary configuration of a drive apparatus for an electric motor according to the sixth embodiment. In a drive apparatus 400-6 for an electric motor according to the sixth embodiment, the noise suppression unit 110 is provided on the alternating-current wires 140e extending from the power substrate 300 to the electric motor 130. In the sixth embodiment, the noise suppression unit 110 is provided on the alternating-current wires 140e, but the noise suppression unit 110 may be provided on the alternating-current wires 160 instead of the alternating-current wires 140e. The other configuration is the same as or equivalent to the configuration of the third embodiment. The same or equivalent components are denoted by the same reference signs, and redundant descriptions are omitted.

The sixth embodiment uses a smaller number of substrates than the fourth embodiment by using the power substrate 300. Since the sixth embodiment does not require the wires 150a, the number of wires for connecting the inverter substrate 100 and the relay substrate 200 is reduced. In the sixth embodiment, since the length of the alternating-current wires 140e is shorter than that of the alternating-current wires 140 of the fourth embodiment, the power substrate 300 and the electric motor 130 can be electrically connected without using a terminal block or swage as described above. Therefore, the sixth embodiment can achieve the effect of simplifying the wiring structure in addition to the effects of the fourth embodiment. Since the amount of usage of the alternating-current wires 140e is reduced, the manufacturing cost of the drive apparatus 400-6 for an electric motor can be reduced. Since the wiring length of the alternating-current wires 140e is shortened, the inductance components of the alternating-current wires 140e are reduced, and EMI noise can be reduced.

In the sixth embodiment, since the noise suppression unit 110 is provided on the alternating-current wires 140e or the alternating-current wires 160, the inductances 500 illustrated in FIG. 9 are formed between the connection points α, β, and γ and the respective windings of the electric motor 130 in the Y connection state. Therefore, the EMI noise propagated between the inverter 60 and the electric motor 130 is suppressed. On the other hand, in the Δ connection state, inductances are formed between the inverter 60 and the respective windings of the electric motor 130 by the noise suppression unit 110. Therefore, the EMI noise propagated between the inverter 60 and the electric motor 130 is suppressed, and the EMI noise resulting from the circulating current flowing between the three-phase windings of the electric motor 130 is further suppressed.

In either the Δ connection state or the Y connection state, the switching noise that occurs when the inverter 60 is driven is a dominant factor of the EMI noise between the inverter 60 and the electric motor 130. By providing the noise suppression unit 110 on the alternating-current wires 140e or the alternating-current wires 160, the EMI noise that occurs when the inverter 60 is driven can be effectively suppressed.

Since the noise suppression unit 110 is provided on the alternating-current wires 140e or the alternating-current wires 160 in the sixth embodiment, the number of attachment places for EMI countermeasure components is small, as compared with the case where EMI countermeasure components are attached to both the alternating-current wires 140e and the alternating-current wires 160. Therefore, a simplified EMI countermeasure structure can be established while preventing an increase in the size and manufacturing cost of the drive apparatus 400-6 for an electric motor. Since the number of attachment places for EMI countermeasure components is small, the characteristic deterioration of EMI countermeasure components and the frequency of failures in EMI countermeasure components are reduced. Owing to the simplified EMI countermeasure structure, the installation space for the drive apparatus 400-6 for an electric motor in the housing of the outdoor unit can be easily secured, making it unnecessary to take a measure such as enlarging the housing of the outdoor unit or rearranging the components inside the outdoor unit. Therefore, an increase in the size or manufacturing cost of the outdoor unit can be prevented. Since the number of attachment places for EMI countermeasure components is small, an increase in the loss due to EMI countermeasure components can be prevented, and the electric motor 130 can be driven with high efficiency and high output.

In the sixth embodiment, an additional noise suppression unit 110 may be provided on the alternating-current wires 140d. When the additional noise suppression unit 110 is provided in this manner, the inductances 500 illustrated in FIG. 9 and the inductances by the additional noise suppression unit are formed in the wires between the alternating-current output terminals 101-3 and the electric motor 130 in the Y connection state. Therefore, EMI noise is suppressed by the total inductance of the inductances 500 and the inductances by the additional noise suppression unit. On the other hand, in the Δ connection state, the inductances 500 illustrated in FIG. 11 are formed between the connection points α, β and γ and the respective windings of the electric motor 130, and the inductances 510 illustrated in FIG. 11 are formed in the alternating-current wires 140. Therefore, the inductances 500 suppress the EMI noise propagated between the inverter 60 and the electric motor 130 and the EMI noise resulting from the circulating current between the three-phase windings of the electric motor 130. Furthermore, the inductances 510 suppress the EMI noise propagated between the inverter 60 and the electric motor 130.

In the sixth embodiment, an additional noise suppression unit 110 may be provided on the wires 150c between the connection points α, β, and γ and the contacts a on the power substrate 300. When the additional noise suppression unit 110 is provided in this manner, the inductances 500 illustrated in FIG. 10 are formed in the wires between the connection points α, β, and γ and the respective windings of the electric motor 130 in the A connection state, and inductances are further formed by the additional noise suppression unit. Therefore, the total inductance of the inductances 500 and the inductances by the additional noise suppression unit can suppress the EMI noise propagated between the inverter 60 and the electric motor 130 and noise components resulting from the circulating current flowing between the three-phase windings.

In the sixth embodiment, an additional noise suppression unit 110 may be provided on the wires extending from the terminal 211 to the contacts b, or an additional noise suppression unit 110 may be provided on the wires 160c extending from the contacts c to the input terminals X', Y', and Z'. When the additional noise suppression unit is provided in this manner, the inductances 500 illustrated in FIG. 9 are formed between the inverter 60 and the respective windings of the electric motor 130 in the Y connection state, and inductances are further formed by the additional noise suppression unit. Therefore, EMI noise can be suppressed by the total inductance of the inductances 500 and the inductances by the additional noise suppression unit. In the Δ connection state, the inductances 500 illustrated in FIG. 10 are formed in the wires between the connection points α, β, and γ and the respective windings of the electric motor 130, and inductances are further formed by the additional noise suppression unit. Therefore, the total inductance of the inductances 500 and the inductances by the additional noise suppression unit can suppress the EMI noise propagated between the inverter 60 and the electric motor 130 and the EMI noise resulting from the circulating current flowing between the three-phase windings.

Instead of the U-phase alternating-current wire 140d, the U-phase alternating-current wire 140e may be connected to the output terminal 60c. Similarly, instead of the V-phase alternating-current wire 140d, the V-phase alternating-current wire 140e may be connected to the output terminal 60d.

Instead of the W-phase alternating-current wire 140d, the W-phase alternating-current wire 140e may be connected to the output terminal 60e. This wiring is also based on the premise in the sixth embodiment that one noise suppression unit 110 is provided on the alternating-current wires 140e. Since the noise suppression unit 110 is provided on the alternating-current wires 140e, it is not necessary to provide an EMI countermeasure structure on pattern wires between the output terminals 60c, 60d, and 60e and the inverter 60. Therefore, the pattern wiring length can be shortened and the wiring structure on the inverter substrate 100 can be simplified significantly, as compared with the case where an EMI countermeasure structure is provided on pattern wires.

In a case where the noise suppression unit 110 is provided on the alternating-current wires 140e or the alternating-current wires 160, it is desirable that the noise suppression unit 110 be provided near the inverter 60. Specifically, in a case where the noise suppression unit 110 is provided on the alternating-current wires 140e, it is desirable that the distance from the noise suppression unit 110 to the electric motor 130 on the alternating-current wires 140e be longer than the distance from the noise suppression unit 110 to the power substrate 300 on the alternating-current wires 140e. In a case where the noise suppression unit 110 is provided on the alternating-current wires 160, it is desirable that the distance from the noise suppression unit 110 to the electric motor 130 on the alternating-current wires 160 be longer than the distance from the noise suppression unit 110 to the power substrate 300 on the alternating-current wires 160. Consequently, the noise suppression unit 110 can be kept away from the electric motor 130. Keeping the noise suppression unit 110 away from the electric motor 130 hinders the transmission of heat and vibration from the electric motor 130 to the noise suppression unit 110. Thus, the characteristic deterioration of the noise suppression unit 110 can be slowed, and the frequency of failures in the noise suppression unit 110 can be reduced.

The drive apparatus 400-6 for an electric motor according to the sixth embodiment may include a mechanism that can switch the windings from Y connection to Y connection and can switch the windings from Δ connection to Δ connection, as described in the first embodiment.

Seventh Embodiment

Figure 14:
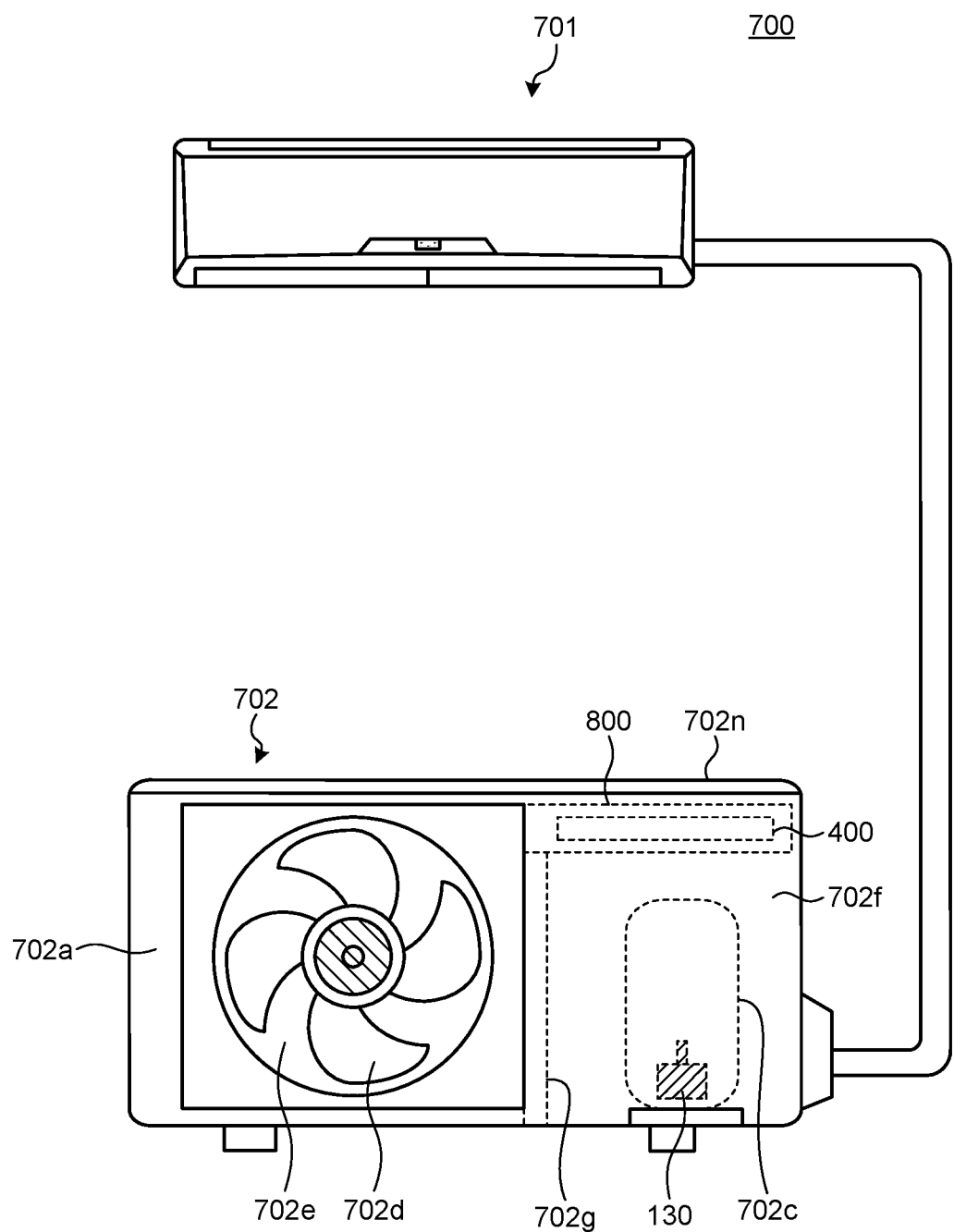
FIG. 14 is a diagram illustrating an exemplary configuration of an air conditioner according to a seventh embodiment.

FIG. 14 is a diagram illustrating an exemplary configuration of an air conditioner according to a seventh embodiment. An air conditioner 700 includes an indoor unit 701 and an outdoor unit 702. The outdoor unit 702 includes a casing 702a, the electric motor 130, a blower fan 702d, a machine chamber 702f, a partition plate 702g, a compressor 702c, and an electrical component box 800.

The casing 702a is a housing that constitutes the outer shell of the outdoor unit 702. A blower chamber 702e is provided between the air outlet on the front side of the casing 702a and heat exchangers (not illustrated). The heat exchangers are provided on the sides and back of the casing 702a. The compressor 702c is placed inside the machine chamber 702f. The machine chamber 702f is a rainproof structure separated from the blower chamber 702e by the partition plate 702g. The compressor 702c can be exemplified by a rotary compressor, a scroll compressor, or a hermetic compressor. A refrigerant compressing unit (not illustrated) and the electric motor 130 are provided inside the compressor 702c. The rotating shaft of the electric motor 130 is connected to the refrigerant compressing unit. The electrical component box 800 is placed near the machine chamber 702*f* and between a top plate 702*n* and the compressor 702*c*. The electrical component box 800 is a quadrangular housing formed by processing metal, an example of a noncombustible material. The electrical component box 800 contains the drive apparatus 400 for an electric motor according to the first embodiment. The electrical component box 800 may contain any of the drive apparatuses 400-2 to 400-6 for an electric motor according to the second to sixth embodiments in place of the drive apparatus 400 for an electric motor. Hereinafter, each of the drive apparatuses 400 to 400-6 for an electric motor is simply referred to as the drive apparatus for an electric motor. The drive apparatus for an electric motor drives the electric motor 130, whereby the refrigerant is compressed in the refrigerant compressing unit connected to the rotating shaft of the electric motor 130. The air conditioner 700 according to the seventh embodiment includes the drive apparatus for an electric motor that enables switching between Δ connection and Y connection. Therefore, the air conditioner 700 can perform both high output operation and high efficiency operation. In addition, since the EMI countermeasure structure is simplified by providing the drive apparatus for an electric motor, the installation space for the drive apparatus for an electric motor in the electrical component box 800 can be easily secured without increasing the size of the electrical component box 800. Therefore, an increase in the size of the outdoor unit 702 can be prevented.

The configurations described in the above-mentioned embodiments indicate examples of an aspect of the present invention. The configurations can be combined with another well-known technique, and some of the configurations can be omitted or changed in a range not departing from the gist of the present invention.

The invention claimed is:

1. A drive apparatus for an electric motor, the drive apparatus comprising:
    an inverter to supply alternating-current power to an electric motor including windings;
    a first substrate on which the inverter is provided;
    a wire connection switch to switch a wire connection state of the windings from Y connection to Δ connection or from Δ connection to Y connection;
    a controller to control the inverter and the wire connection switch;
    a first alternating-current wire electrically connected at one end to the inverter and electrically connected at another end to ends on one side of the windings;
    a second alternating-current wire electrically connected at one end to the first alternating-current wire and electrically connected at another end to one end of the wire connection switch;
    a third alternating-current wire electrically connected at one end to another end of the wire connection switch and electrically connected at another end to ends on another side of the windings; and
    a first noise suppressor provided on the first alternating-current wire between a connection point of the first alternating-current wire and the second alternating-current wire and the windings of the electric motor to suppress noise that occurs in the first alternating-current wire.

2. The drive apparatus for an electric motor according to claim 1, further comprising:
    a second noise suppressor provided on the first alternating-current wire between the inverter and the connection point of the first alternating-current wire and the second alternating-current wire; and
    a third noise suppressor provided on the second alternating-current wire.

3. An air conditioner comprising
    the drive apparatus for an electric motor according to claim 2.

4. The drive apparatus for an electric motor according to claim 1, further comprising:
    a second noise suppressor provided on the first alternating-current wire between the inverter and the connection point of the first alternating-current wire and the second alternating-current wire; and
    a fourth noise suppressor provided on the third alternating-current wire.

5. An air conditioner comprising
    the drive apparatus for an electric motor according to claim 4.

6. The drive apparatus for an electric motor according to claim 1, further comprising:
    a second noise suppressor provided on the first alternating-current wire between the inverter and the connection point of the first alternating-current wire and the second alternating-current wire;
    a third noise suppressor provided on the second alternating-current wire; and
    a fourth noise suppressor provided on the third alternating-current wire.

7. An air conditioner comprising
    the drive apparatus for an electric motor according to claim 6.

8. An air conditioner comprising
    the drive apparatus for an electric motor according to claim 1.

* * * * *